US012059000B1

(12) United States Patent
Marenda et al.

(10) Patent No.: US 12,059,000 B1
(45) Date of Patent: Aug. 13, 2024

(54) USE OF ERYTHRITOL COMPOSITIONS AS MAMMAL-SAFE INSECTICIDES

(71) Applicant: Drexel University, Philadelphia, PA (US)

(72) Inventors: Daniel R. Marenda, Elkins Park, PA (US); Sean O'Donnell, Swarthmore, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 17/970,184

(22) Filed: Oct. 20, 2022

Related U.S. Application Data

(63) Continuation of application No. 17/466,977, filed on Sep. 3, 2021, now abandoned.

(60) Provisional application No. 63/074,237, filed on Sep. 3, 2020.

(51) Int. Cl.
| | | |
|---|---|---|
| *A01N 31/02* | (2006.01) | |
| *A01N 25/00* | (2006.01) | |
| *A01N 25/10* | (2006.01) | |
| *A01N 25/30* | (2006.01) | |
| *A01P 7/04* | (2006.01) | |
| *A01P 19/00* | (2006.01) | |

(52) U.S. Cl.
CPC ........... *A01N 31/02* (2013.01); *A01N 25/006* (2013.01); *A01N 25/10* (2013.01); *A01N 25/30* (2013.01); *A01P 7/04* (2021.08); *A01P 19/00* (2021.08)

(58) Field of Classification Search
CPC ...... A01N 31/02; A01N 25/006; A01N 25/10; A01N 25/30; A01P 7/04; A01P 19/00
See application file for complete search history.

(56) References Cited

U.S. PATENT DOCUMENTS

| | | | |
|---|---|---|---|
| 3,165,442 A | 1/1965 | John | |
| 4,823,506 A | 4/1989 | Demarest et al. | |
| 5,166,193 A | 11/1992 | Levin et al. | |
| 5,667,573 A | 9/1997 | Kondou | |
| 6,216,384 B1 | 4/2001 | Dickson et al. | |
| 8,475,759 B2 | 7/2013 | Black et al. | |
| 8,975,292 B2 | 3/2015 | Taranta et al. | |
| 2002/0146394 A1 | 10/2002 | Stamets | |
| 2004/0062785 A1 | 4/2004 | Parker | |
| 2008/0181863 A1 | 7/2008 | Birmingham et al. | |
| 2009/0004355 A1 | 1/2009 | Catani et al. | |
| 2010/0043276 A1 | 2/2010 | Eger et al. | |
| 2010/0227010 A1 | 9/2010 | Jones | |
| 2010/0233327 A1 | 9/2010 | Hersh | |
| 2010/0317614 A1 | 12/2010 | Bachelet et al. | |
| 2014/0342074 A1 | 11/2014 | Kim et al. | |
| 2016/0075992 A1 | 3/2016 | Jackson et al. | |
| 2017/0013832 A1 | 1/2017 | Marenda et al. | |
| 2020/0154708 A1 | 5/2020 | Stadler et al. | |
| 2020/0396996 A1 | 12/2020 | Choi et al. | |

FOREIGN PATENT DOCUMENTS

| | | |
|---|---|---|
| EP | 397027 B1 | 2/1995 |
| WO | 2007019148 A2 | 2/2007 |
| WO | 2007019237 A2 | 2/2007 |
| WO | 2013039365 A2 | 3/2013 |
| WO | 2020002584 A1 | 1/2020 |

OTHER PUBLICATIONS

Gordesky-Gold , et al., "*Drosophila melanogaster* Prefers Compounds Perceived Sweet by Humans", Chem. Senses, 33, 2008, 301-309.
European Search Report for European Patent Application No. 15772647.2 issued Sep. 15, 2017.
International Search Report and Written Opinion for PCT International Application No. PCT/US2015/024224 issued Jul. 6, 2015.
"International Search Report and Written Opinion dated Dec. 13, 2021 for International Application No. PCT/US21/049127".
"PubChemCID 22285", https://pubchem.ncbi.nlm.nih.gov/compound/Erythritol; downloaded Dec. 17, 2019, 2004.
Barrett , et al., "Larval mannitol diets increase mortality, prolong development and decrease adult body sizes in fruit flies (*Drosophila melanogaster*)", The Company of Biologists Ltd | Biology Open; bio047084. doi:10.1242/bio.047084, 2019.
Barrett , et al., "Potential for Use of Erythritol as a Socially Transferrable Ingested Insecticide for Ants (Hymenoptera: Formicidae)", Journal of Economic Entomology, XX(XX); doi: 10.1093/jee/toaa019, Jan. 7, 2020.
Baudier , et al., "Erythritol, a non-nutritive sugar alcohol sweetener and the main component of truvia®, is a palatable ingested insecticide", PLoS One. 9(6), 2014, e98949.
Beers , 2011.
Caponera , et al., "Erythritol Ingestion Causes Concentration-Dependent Mortality in Eastern Subterranean Termites (Blattodea: Rhinotermitidae)", Journal of Economic Entomology, XX(XX); doi: 10.1093/jee/toz260, Jan. 5, 2019.

(Continued)

*Primary Examiner* — Mina Haghighatian
*Assistant Examiner* — Nathan W Schlientz
(74) *Attorney, Agent, or Firm* — Saul Ewing LLP; Kathryn Doyle; Domingos J. Silva

(57) ABSTRACT

The disclosure provides a human-safe method of killing or controlling insects using a non-toxic composition comprising erythritol ((2R,3S)-butane-1,2,3,4-tetraol). The disclosure also provides non-toxic compositions comprising erythritol suitable for killing insects in residential, commercial, and agricultural locales.

13 Claims, 9 Drawing Sheets

(56) References Cited

OTHER PUBLICATIONS

Choi, et al., "Effect of Erythritol on *Drosophila suzukii* (Diptera: Drosophilidae) in the Presence of Naturally-Occurring Sugar Sources, and on the Survival of Apis mellifera (Hymenoptera: Apidae)", Journal of Economic Entomology, 112(2), 2019, 981-985.

Choi, et al., "Effect of non-nutritive sugars to decrease the survivorship of spotted wing *Drosophila, Drosophila suzukii*", Journal of Insect Physiology, 99, 2017, 86-94.

Fiocca, et al., "Mannitol ingestion causes concentrationdependent, sex-biased mortality in adults of the fruit fly (*Drosophila melanogaster*)", PLOS One | https://doi.org/10.1371/journal.pone.0213760, May 31, 2019.

Gilkey, et al., "Lethal effects of erythritol on the mosquito *Aedes aegypti Linnaeus* (Diptera: Culicidae)", J Appl Entomol.;142:, 2018, 873-811.

Haghighian, "Pestycydy, 1-2", 2008, 51-29.

Hassett, et al., "The Utilization of Sugars and Other Substances by *Drosophila*", The Biological Bulletin, 95(1),, Jan. 17, 1948.

Kastanis, et al., "Macroevolutionary relationships of species of *Drosophila melanogaster* group based on mtDNA sequences", Molecular Phyla Genetics and Evolution, 28, 2003, 518-528.

Kostal, et al., "Multiple component system of sugars and polyols in the overwintering spruce bark beetle, *Ips typographus*", Journal of Insect Physiology; 53, 2007, 580-586.

McGraw, et al., "Beyond insecticides: new thinking on an ancient problem", Nature Reviews | Microbiology vol. 11 |, Mar. 2013, 181.

O'Donnell, et al., "Erythritol ingestion impairs adult reproduction and causes larval mortality in *Drosophila melanogaster* fruit flies (Diptera: Drosophilidae)", J Appl Entomol.;142:, 2018, 37-42.

O'Donnell, et al., "Non-Nutritive Polyol Sweeteners Differ in Insecticidal Activity When Ingested by Adult *Drosophila melanogaster* (Diptera: Drosophilidae)", Journal of Insect Science; 16(1): 47; doi: 10.1093/jisesa/iew031, Jan. 1-3, 2016.

Romanchik-Cerpovicz, et al., "Poster Session: Science/Education/Management/Foodservices/Culinary Research—Physical and Sensory Characteristics of Plain and Yam Fortified Applesauce Containing Truvia", Journal of the American Dietetic Association; vol. 111, Issue 9, Suppl., Sep. 2001, A63.

Sampson, et al., "Erythritol and Lufenuron Detrimentally Alter Age Structure of Wild *Drosophila suzukii* (Diptera: Drosophilidae) Populations in Blueberry and Blackberry", Journal of Economic Entomology; doi: 10.1093/jee/tow307, Jan. 5, 2017.

Sampson, et al., "Ingestible insecticides for spotted wing *Drosophila* control: a polyol, Erythritol, and an insect growth regulator, Lufenuron", J. Appl. Entomol.,, 2016.

Sampson, et al., "Laboratory and Field Assessments of Erythritol Derivatives on the Survival, Reproductive Rate, and Control of *Drosophila suzukii* (Diptera: Drosophilidae)", Journal of Economic Entomology, XX(X); doi: 10.1093/jee/toy274, Jan. 8, 2018.

Schreiber, et al., "The uptake of organic molecules by the ventral tube of Tomocerus flavescens (Tullberg, 1871) (Insecta: Collembola)", J. Insect. Physiol. 31(1), 1985, 59-70.

Silva, et al., "An a-Glucosidase from Perimicrovillar Membranes of zyDxwyvustsdrqpeonrmclkujihsgfedpcbeaZrYuXWvViUaTSnRQuPsO NMLKJIHGFEDCBA (Hemiptera: Pyrrhocoridae) Midgut Cells. Purification and Properties", Insect Biochem. Molec. Biol., vol. 25, No. 4, 1995, 487-494.

Storey, et al., "Gastrointestinal tolerance of erythritol and xylitol ingested in a liquid", European Journal of Clinical Nutrition, 61,, 2007, 349-354.

Tokuoka, et al., "Comparison of Three Forms of Erythrose Reductase From an *Aureobasidium* Sp. Mutant", J. Gen. Appl. Microbiol., 38,, 1992, 145-155.

Tsiropoulos, "Carbohydrate utilization by normal and [gamma]-sterilized Dacus oleae", J. Insect Phsyiol. 26, 1980, 633-637.

FIG. 6
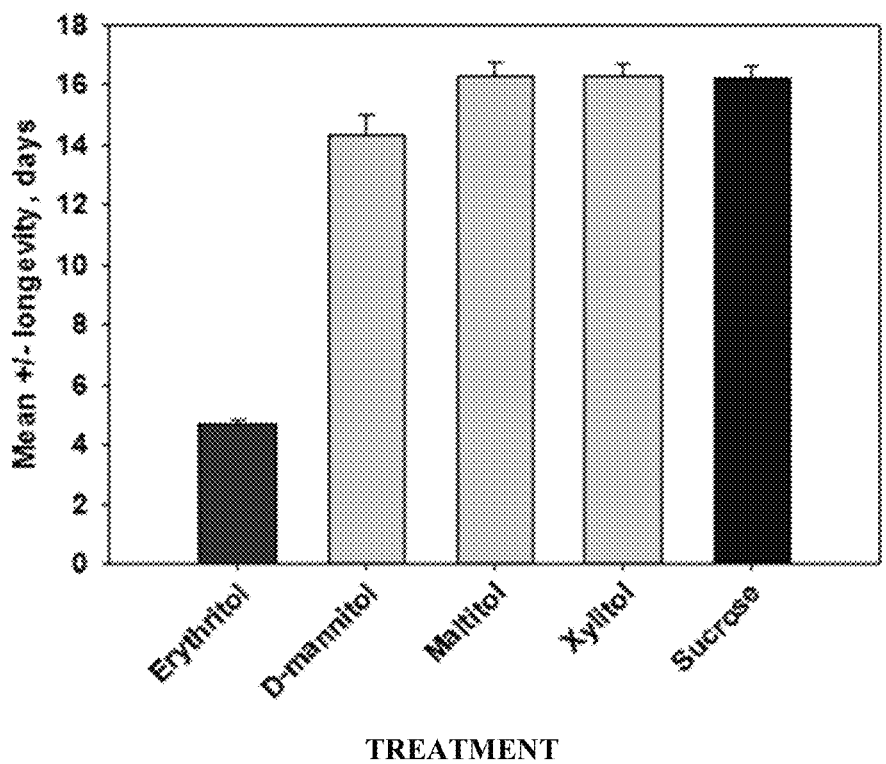
TREATMENT
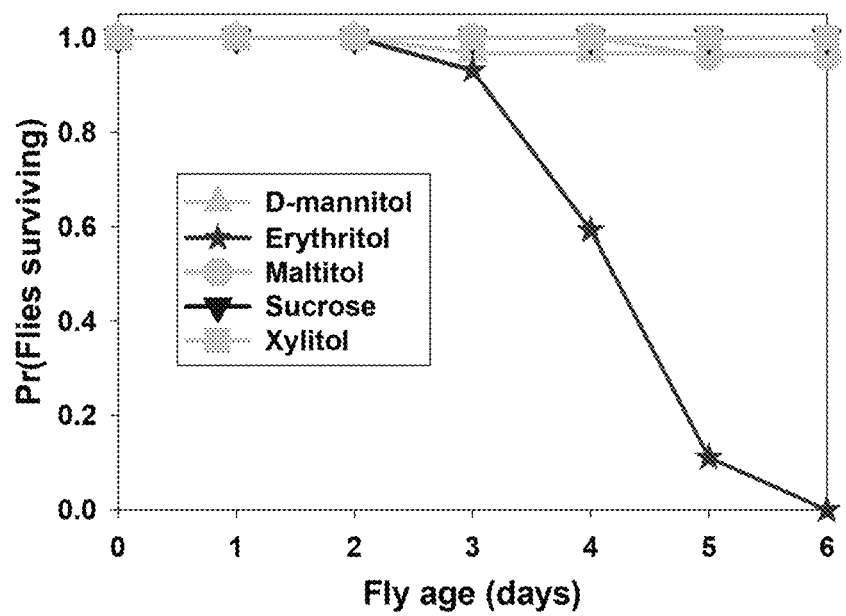

FIG. 7
| Artificial Sweetener | Active Component | Structure |
|---|---|---|
| Sweet'n Low® | Saccharin | 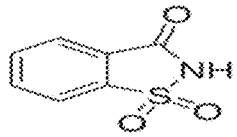 |
| Equal® | Aspartame | 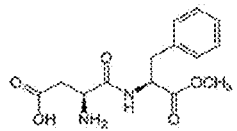 |
| Splenda® | Sucralose | 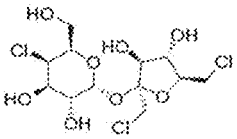 |
| PureVia® | Steviol | 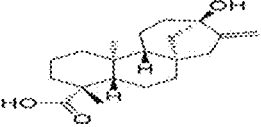 |
| Truvia® | Steviol | 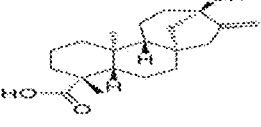 |
| Sucrose | Glucose and Fructose | 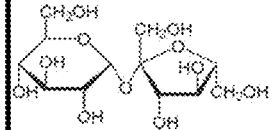 |
| Erythritol | Erythritol | 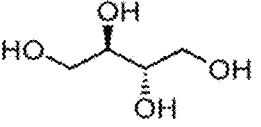 |

FIG. 8A
FIG. 8B
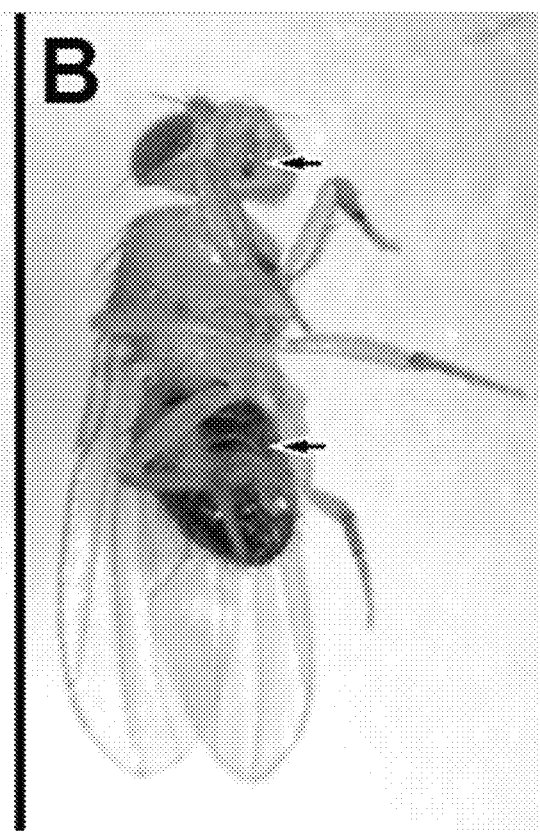

USE OF ERYTHRITOL COMPOSITIONS AS MAMMAL-SAFE INSECTICIDES

CROSS-REFERENCE TO RELATED APPLICATIONS

The present application is a continuation of, and claims priority to, U.S. application Ser. No. 17/466,977, filed Sep. 3, 2021, which claims priority under 35 U.S.C. § 119(e) to U.S. Provisional Patent Application No. 63/074,237, filed Sep. 3, 2020, which applications are incorporated herein by reference in their entireties.

STATEMENT REGARDING FEDERALLY SPONSORED RESEARCH OR DEVELOPMENT

This invention was made with government support under grants number 1209072 and 1256114 awarded by National Science Foundation. The government has certain rights in the invention.

BACKGROUND OF THE INVENTION

Insects such as, for example, ants, mosquitos, fruit flies, and termites have significant worldwide deleterious impact on human health, agriculture, and economic growth (McGraw, et al., Nat Rev Microbiol 11:181-193). The annual cost of application of insecticides for the prevention of insect damage has been estimated at $10 Billion in the US alone (Pimentel, et al., 2005, Environment, Development and Sustainability 7:229-252). Further, widespread use of toxic insecticides continues to pose a significant threat to human health, as highlighted by recent deaths in Bihar, India (Subramanian, et al., 2013, The New York Times). Many synthetic insecticides suffer drawbacks including high production costs, concern over environmental sustainability, harmful effects on human health, unintended targeting of insect species, and the evolution of resistance among insect populations.

Damage from insect infestations is economically significant and control can be costly when requiring the widespread use of conventional insecticides. Therefore, there is a great need in the art for the identification of cost-effective and human-safe insecticides to control insect populations. The present invention addresses this need.

SUMMARY OF THE INVENTION

In one aspect, the disclosure provides a composition comprising:
- about 1-50% w/w erythritol;
- about 1-50% w/w feeding stimulant; and
- at least one additional component selected from the group consisting of water, an odorant, a nitrogen source, a sodium salt, a thickener, an attractant, a defoamer, a dispersing agent, a feeding stimulant, a flavoring agent, a surfactant, a preservative, a gel-forming component, a suspending agent, and an oil. The composition is suitable for use in an insect bait or trap. The composition is, in various aspects, non-toxic to humans and can be used to kill or impair a wide variety of insect species, including termites, leaf cutter ants, mosquitoes, and the like, as set forth in detail herein.

BRIEF DESCRIPTION OF THE DRAWINGS

For the purpose of illustrating the invention, certain embodiments of the invention are depicted in the drawings. However, the invention is not limited to the precise arrangements and instrumentalities of the embodiments depicted in the drawings.

FIG. 6 is a set of graphs illustrating distinct insecticidal effects of human-safe sweet alcohols. Results illustrate that flies fed non-nutritive alcohols other than erythritol (such as D-mannitol, maltitol, sucrose and xylitol) had significantly greater longevity than erythritol-fed flies, and did not differ from sugar control.

FIG. 7 is a table illustrating a list of artificial sweeteners and active compounds used in this study.

FIGS. 8A-8B are a set of images illustrating that blue food labeling indicated that *Drosophila melanogaster* consume food containing TRUVIA and other non-nutritive sweeteners. Illustrated are representative female (FIG. 8A) and male (FIG. 8B) flies with blue abdomens and proboscises (indicated by arrows in FIGS. 8A-8B).

Figure 10:
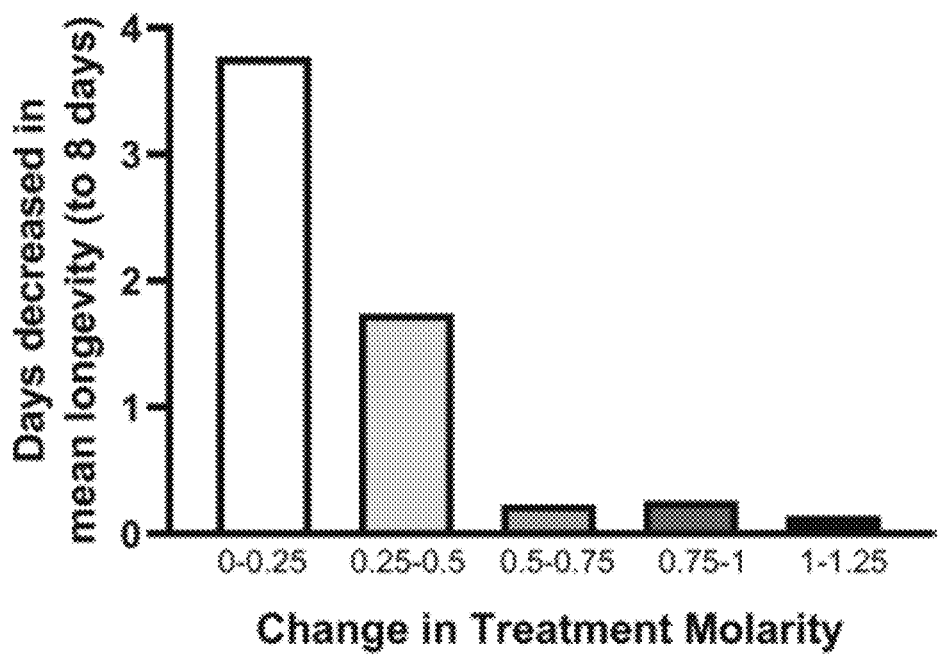

FIG. 10 is a graph illustrating that erythritol ingestion causes larger changes in longevity at lower concentrations. Decrease in mean longevity to 8 d between consecutive increases (0-1.25 M) in treatment molarity.

Figure 11:
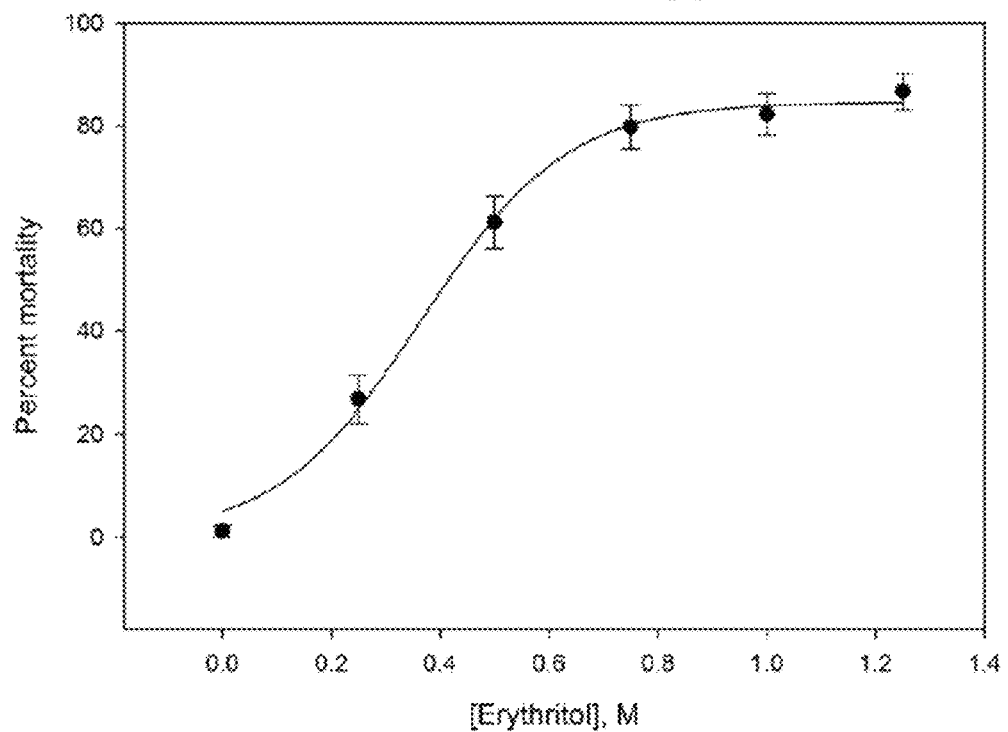

FIG. 11 is a graph illustrating the $LC_{50}$ of erythritol at 48 h is 0.42 M for *R. flavipes* workers. Percent mortality at 48 h plotted against concentration of erythritol used for treating filter papers. The three-parameter, best-fit sigmoidal curve is shown, and the function was used to calculate $LC_{50}$ at 48 h (0.42 M). Error bars represent one standard deviation.

Figure 12:
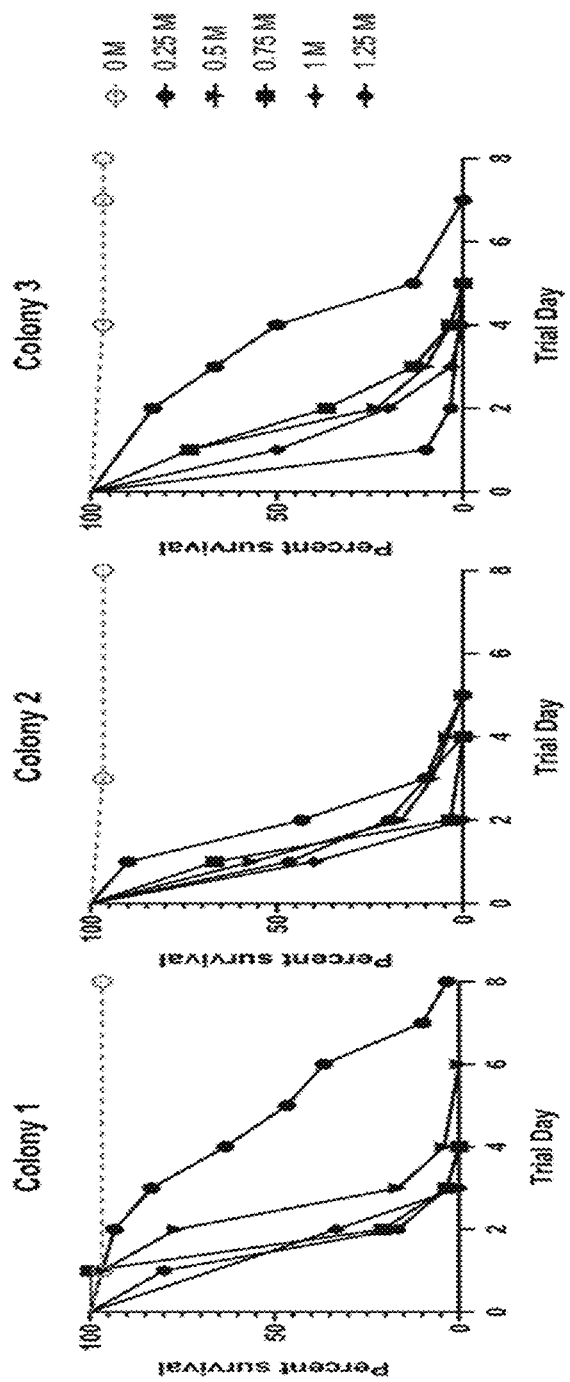

FIG. 12 are graphs illustrating that colonies vary in worker susceptibility to erythritol toxicity. Survival plots showing percent survival of worker *R. flavipes* over time from three different colonies (n=30 workers/treatment/colony). Individual lines represent treatment groups receiving filter papers treated with increasing concentrations of erythritol (0-1.25 M). Colonies differed significantly at all concentrations.

DETAILED DESCRIPTION OF THE INVENTION

The present invention relates to unexpected discovery of a novel method of killing or impairing an insect without substantially harming a mammal. The method comprises administering to the insect a composition comprising erythritol (also known as (2R,3S)-butane-1,2,3,4-tetraol). In certain embodiments, the composition is not substantially toxic when administered to a mammal. In one aspect of the invention, erythritol composition is safe to mammal, even in case of accidental consumption. In fact, erythritol was approved by US Food and Drug Administration (US FDA) in 2001 to be used as a food additive in US. It is well known that consumption of erythritol, even in high concentrations, is safe to humans. In certain embodiments, the mammal is human.

As, an example, erythritol is used as a novel toxicant in method of termite control is investigated herein. Eastern subterranean termites, *Reticulitermes flavipes* Kollar (*Blattodea: Rhinotermitidae*), were fed paper foods treated with increasing concentrations of erythritol and were assessed for mortality and bait consumption. Termite survival to 8 d (the duration of the experiment) significantly decreased as erythritol treatment concentration increased, indicating that the lethal effects of erythritol were concentration-dependent. Termites consumed erythritol-treated paper at all concentrations and did not display avoidance in choice assays, suggesting that erythritol may be practical for use as ingestible bait. These results provide a basis for further development of erythritol as a safe alternative method of termite control.

Definitions

Unless defined otherwise, all technical and scientific terms used herein have the same meaning as commonly understood by one of ordinary skill in the art to which the invention pertains. Although any methods and materials similar or equivalent to those described herein may be used in the practice for testing of the present invention, the preferred materials and methods are described herein. In describing and claiming the present invention, the following terminology will be used.

It is also to be understood that the terminology used herein is for the purpose of describing particular embodiments only and is not intended to be limiting.

As used herein, the articles "a" and "an" are used to refer to one or to more than one (i.e., to at least one) of the grammatical object of the article. By way of example, "an element" means one element or more than one element.

The term "about" as used herein can allow for a degree of variability in a value or range, for example, within 10%, within 5%, or within 1% of a stated value or of a stated limit of a range, and includes the exact stated value or range.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH═C═CCH$_2$, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

The term "contact" refers to touching any part of an insect with any of the compositions described herein such that the contact leads to absorption or ingestion of the composition by the insect. Absorption can be external or internal (gastrointestinal) absorption of erythritol.

As used herein, the term "effective concentration" or "effective amount" as relating to erythritol refers to the concentration or amount of erythritol in the composition which is sufficient to impair or kill insects when administered to them.

As used herein, the term "EQUAL" refers to a non-nutritive sweetener, comprising dextrose, aspartame, acesulfame potassium, starch, silicon dioxide (an anti-caking agent), maltodextrin, and unspecified flavoring, sold under the trademark EQUAL®. The chemical structure of its sweetening ingredient is illustrated in FIG. 7.

As used herein, the term "impair" refers to the ability to disrupt to a measurable degree the metabolism, feeding, defense, aggression, reproduction and/or mobility of an organism, such as, but not limited to, an insect.

As used herein, the term "M" refers to molar concentration, which is defined as the amount of a constituents in moles divided by the volume of the composition.

As used herein, the term "PUREVIA" refers to a non-nutritive sweetener, comprising dextrose, cellulose powder, and natural flavors, as well as the stevia extract rebaudioside A, which is sold under the trademark PUREVIA®. The chemical structure of its sweetening ingredient is illustrated in FIG. 7.

As used herein, the term "TRUVIA" refers to a non-nutritive sweetener, comprising erythritol, stevia leaf extract, and natural flavors, which is sold under trademark TRUVIA®. The chemical structure of its sweetening ingredient is illustrated in FIG. 7.

As used herein, the term "SPLENDA" refers to a sucralose-based artificial sweetener derived from sugar, which is sold under the trademark SPLENDA®. The chemical structure of its sweetening ingredient is illustrated in FIG. 7.

The term "solvent" as used herein refers to a liquid that can dissolve a solid, liquid, or gas. Non-limiting examples of solvents are silicones, organic compounds, water, alcohols, ionic liquids, and supercritical fluids.

As used herein, the term "substantially toxic" to an organism refers to a substance or compound that causes significant damage or health threat to the organism. In certain embodiments, the substantially toxic substance or compound disrupts or interferes with the health and/or well-being of the organism, disables the organism, prevents the organism from performing usual and expected activities, and/or kills the organism.

The term "mammal", as used therein, may be a human or non-human mammal. Non-human mammals include, for example, livestock and pets, such as ovine, bovine, porcine, canine, feline and murine mammals. Preferably, the mammal is human.

Compositions For Killing Insects

In certain embodiments, the invention provides a composition for killing or impairing an insect's ability to function. Insects include various species of ants, mosquitos, termites, flies, bees, beetles, moths, wasps, yellow jackets, ants, cockroaches, bed bugs, and/or silverfish. The composition comprises erythritol [(2R,3S)-butane-1,2,3,4-tetraol] and at least one additive. In certain embodiments, the composition is not substantially toxic when administered to a mammal. In various embodiments, the mammal is a human. Impairing includes the respective insect not being able to walk, fly, attract mates, reproduce, lay eggs, or produce viable offspring. The at least one additive, in one embodiment, is an agriculturally acceptable additive. In some embodiments, the additive is a food-safe and is approved for human consumption. In various embodiments, the erythritol is the only insecticide or insecticidally active agent in the composition.

Affected Insect Species

In certain embodiments, an insect killed or impaired by the compositions herein is a fly belonging to the *Drosophila* genus. In yet other embodiments, the fly is at least one of *D. melanogaster, D. immigrans, D. simulans, D. subobscura, Zaprionus indianus, D. bifurca, D. sechellia, D. yakuba, D. erecta, D. ananassae, D. suzukii, D. pseudoobscura, D. persimilis, D. willistoni, D. mojavensis, D. virilis* or *D. grimshawi, Musca domestica, Stomoxys calcitrans*, and *Bactrocera dorsalis*.

In certain embodiments, an insect killed or impaired by the compositions herein is an ant belonging to at least one of the following species: *Tetramorium* sp, *Formica* sp, *Camponotus* sp., *Solenopsis invicta, T. immigrans, Formica glacialis, Camponotus, chromaiodes*, and *Camponotus subarbatus* Sp.

In certain embodiments, the ant is a leaf cutter ant belonging to *Acromyrmex* genus and is selected from the group consisting of *Acromyrmex ambiguus, Acromyrmex*

*ameliae, Acromyrmex aspersus, Acromyrmex balzani, Acromyrmex biscutatus, Acromyrmex coronatus, Acromyrmex crassispinus, Acromyrmex diasi, Acromyrmex disciger, Acromyrmex echinatior, Acromyrmex evenkul, Acromyrmex fowleri, Acromyrmex fracticornis, Acromyrmex heyeri, Acromyrmex hispidus, Acromyrmex hystrix, Acromyrmex insinuator, Acromyrmex landolti, Acromyrmex laticeps, Acromyrmex lobicornis, Acromyrmex lundii, Acromyrmex niger, Acromyrmex nigrosetosus, Acromyrmex nobilis, Acromyrmex octospinosus, Acromyrmex pubescens, Acromyrmex pulvereus, Acromyrmex rugosus, Acromyrmex silvestrii, Acromyrmex striatus, Acromyrmex subterraneus, Acromyrmex versicolor, Acromyrmex volcanus.*

In certain embodiments, the ant is a leaf cutter ant belongs to *Atta* genus and is selected from the group consisting of *Atta bisphaerica, Atta capiguara, Atta cephalotes, Atta colombica, Atta cubana, Atta goiana, Atta insularis, Atta laevigata, Atta mexicana, Atta opaciceps, Atta pilosa, Atta robusta, Atta saltensis, Atta sexdens, Atta tardigrada, Atta texana, Atta vollenweideri.*

Leaf cutter ants cultivate a fungus from the family Lepiotaceae in their colonies and exhibit an ant-fungus mutualism whereby the ants supply cellulosic (plant) material for the fungus to consume and the fungus feeds the ants from nutrients produced in its hyphal tips. In various embodiments, the composition interferes with the symbiotic relationship between the leaf cutter ants and the fungus. In some embodiments, the composition is toxic to the fungus as well as the leaf cutter ants. In some embodiments, the fungus is unharmed by the composition, but the nutrient fluid produced by the fungus has reduced nutritional value or is toxic to the ants. In certain embodiments, the fungus belongs to genus *Leucoagaricus* and includes *Leucoagaricus gongylophorus*

In certain embodiments, an insect killed or impaired by the compositions herein is a mosquito belonging to the *Aedes* species mosquitoes (*Ae. aegypti*), *Culex* species mosquitoes (*Cx. pipiens, Cx. tarsalis, Cx. quinquefasciatus*) *Anopheles* species mosquitoes (*An. freeborni* and *An. Quadrimaculatus*).

In certain embodiments, an insect killed or impaired by the compositions herein is a termite species selected from the group consisting of *Reticulitermes flavipes, Reticulitermes virginicus, Reticulitermes hageni, Coptotermes formosanus, Amitermes floridensis, Incitermes minor,* and *Neothermes connexus, R. hesperus, R tibialis,* and *Heterotermes aureus,* as well as termite species of the families (and pest genera) Mastotermitidae (*Mastotermes* species), Hodotermididae (*Anacanthotermes, Zootermopsis* species), Rhinotermitidae (*Coptotermes, Heterotermes, Reticulitermes, Psammotermes, Prorhinotermes, Schedorhinoterme* species), Kalotermitidae (*Glyptotermes, Neotermes, Coptotermes, Incisitermes, Kalotermes, Marginiterme* species), Serritermitidae, and Termitidae (*Pericapritermes, Allodontermes, Microtermes, Odontotermes, Nasutitermes, Termes, Amitermes, Globitermes, Microceroterme* species), Termopsidae (*Hodotermopsis, Zootermopsis* species), and other pest species of termites. In certain embodiments, the termite is species selected from the group consisting of *Reticulitermes* sp., *Heterotermes* sp., and *Termitidae* sp.

In certain embodiments, an insect killed or impaired by the compositions herein is selected from the group consisting of the butterflies and moths (Lepidoptera) In certain embodiments, an insect killed or impaired by the compositions herein is selected from the group consisting of cutworms and armyworms (Family: Noctuidae).

Specifically, in certain embodiments, the insect is selected from the group consisting of *Agrotis segetum, A. ipsilon, A. exclamationis, Noctua pronuba, Peridroma saucia, Spodoptera litura, Helicoverpa armigera, Helicoverpa zea, Busseola fusca, Heliocheilus albipunctella, Sesamia calamistis, Spodoptera exempta, Autographa gamma, Chrysodeixis chalcites, Lacanobia oleracea, Mamestra brassicae, Spodoptera exigua, Spodoptera frugiperda, Mythimna convecta, Persectania ewingii,* and *Persectania dyscrita.*

In certain embodiments, an insect killed or impaired by the compositions herein is a corn borer/borer (Family: Crambidae). Specifically, in certain embodiments, the insect is selected from the group consisting of: *Ostrinia furnacalis, Leucinodes orbonalis, Ostrinia nubilalis, Coniesta ignefusalis, Chilo partellus, Chilo suppressalis, Crambus* spp., *Duponcheia fovealis, Diatraea saccharalis, Scirpophaga innotata, Diatraea grandiosella, Desmia maculalis,* and *Maruca vitrata.*

In certain embodiments, an insect killed or impaired by the compositions herein is selected from the group consisting of tuber moths and leafminers (Family: Gelechiidae). Specifically, in certain embodiments, the insect is selected from the group consisting of *Phthorimaea operculella, Anarsia lineatella, Aproaerema modicella, Keiferia lycopersicella, Pectinophora gossypiella, Sitotroga cerealella, Tecia solanivora, Tuta absoluta,* and *Gossypium hirsutum.*

In certain embodiments, an insect killed or impaired by the compositions herein is selected from the group consisting of fruit moths and budworms (Family: Tortricidae). Specifically, in certain embodiments, the insect is selected from the group consisting of *Choristoneura fumiferana, Adoxophyes orana, Archips podana, Archips rosana, Argyrotaenia ijungiana, Cydia molesta, Cydia pomonella, Cydia funebrana, Cydia nigricana, Cydia splendana, Epiphyas postvittana, Grapholita delineana, Grapholita molesta, Grapholita packardi, Lobesia botrana, Pandemis cerasana, Paralobesia viteana, Sparganothis pilleriana, Spilonota ocellana,* and *Thaumatotibia leucotreta.*

In certain embodiments, an insect killed or impaired by the compositions herein is a beetle (Coleoptera).

In certain embodiments, an insect killed or impaired by the compositions herein is a Weevil. (Family: Curculionidae). Specifically, the insect is selected from the group consisting of *Otiorhynchus sulcatus, Rhynchophorus furrugineus, Listroderes costirostris, Hylobius abietis, Sitophilus granarius, Sitophilus zeamais, Anthonomous grandis, Sitophilus oryzae, Rhyzopertha dominica, Acanththoscelides obtectus,* and *Cylindrocopturus adspersus.*

In certain embodiments, an insect killed or impaired by the compositions herein is selected from the group consisting of Leaf and flea beetles (Family: Chrysomelidae). Specifically, the insect is selected from the group consisting of *Leptinotarsa decemlineata, Crioceris asparagi, Oulema melanopus, Phaedon cochleariae, Psylliodes chrysocephala, Phyllotreta cruciferae, Phyllotreta striolata, Phyllotreta* spp., and *Epitrix* spp.

In certain embodiments, an insect killed or impaired by the compositions is selected from the group consisting of wireworms and wlick beetles (Family: Elateridae). Specifically, the insect is selected from the group consisting of *Agriotes lineatus, Agriotes obscurus, Agriotes sputator, Agriotes* spp., and *Conoderus amplicollis.*

In certain embodiments, an insect killed or impaired by the compositions herein is a Girdle/Longhorn beetle (Family: Cerambycidae). Specifically, in certain embodiments, the insect is selected from the group consisting of *Oberea*

*brevis, Hylotrupes bajulus, Anoplophora chinensis, Anoplophora glabripennis, Cacosceles newmannii,* and *Tetropium fuscum*

In certain embodiments, an insect killed or impaired by the compositions herein is a Mealworm (Family: Tenebrionidae), specifically: *Tenebrio molitor.*

In certain embodiments, an insect killed or impaired by the compositions herein is selected from the group consisting of grain beetles and flour beetles (Family: Bruchidae). Specifically, the insect is selected from the group consisting of *Callosobruchus chinensis, C. maculates,* and *C. analis*

In certain embodiments, an insect killed or impaired by the compositions herein is a true bugs (Hemiptera)

In certain embodiments, an insect killed or impaired by the compositions selected from the group consisting of cereal aphids and aphids (Family: Aphididae). Specifically, the insect is selected from the group consisting of *Metopolophium dirhodum, Sitobion avenae, Rhopalosiphum padi, Myzus persicae, Aphis fabae, Aphis gossypii, Gryllo-prociphilus imbricator, Brevicoryne brassicae, Cinara cupressi, Macrosiphum euphorbiae, Melaphis chinensis, Acyrthosiphon pisum, Pemphigus betae, Macrosiphum rosae, Diuraphis noxia, Sipha flava, Aphis glycines, Toxoptera citricida,* and *Simulium* spp.

In certain embodiments, an insect killed or impaired by the compositions herein is selected from the group consisting of Leafhoppers and sharpshooters (Family: Cicadellidae). Specifically, the insect is selected from the group consisting of *Circulifer tenellus, Cicadulina mbila, Empoascafabae, Sophonia rufofascia, Graphocephala atropunctata, Homalodisca vitripennis, Orosius orientalis, Nephotettix* spp., *Typhlocyba pomeria,* and *Homalodisca vitripennis.*

In certain embodiments, an insect killed or impaired by the compositions herein is a white fly (Family: Aleyrodidae). Specifically, the insect is selected from the group consisting of *Aleurocanthus woglumi, Aleyrodes proletella, Bemisia tabaci, Bemisia argentifolii,* and *Trialeurodes vaporariorum.*

In certain embodiments, an insect killed or impaired by the compositions is a Mealybug (Family: Pseudociccidae). Specifically, the insect is selected from the group consisting of *Planococcus citri, Pseudococcus longispinus, Maconellicoccus hirsutus, Pseudococcus viburni, Planococcus ficus, Phenacoccus solenopsis, Pseudococcus maritimus.*

In certain embodiments, an insect killed or impaired by the compositions hereinis a Stinkbug/shieldbug (Family: Pentatomidae). Specifically, the insect is selected from the group consisting of *Halyomorpha halys, Oebalus pugnax, Chinavia hilaris, Nezara viridula, Pentatoma rufipes,* and *Erthesina fullo.*

In certain embodiments, an insect killed or impaired by the compositions herein is a Scale insect selected from the group consisting of *Icerya purchase* and *Cercoplastes sinensis.*

In certain embodiments, an insect killed or impaired by the compositions herein selected from the group consisting of Crickets, grasshoppers and locusts (Orthoptera)

In certain embodiments, an insect killed or impaired by the compositions herein is a Mole cricket (Family: Gryllotalpidae). Specifically, the insect is selected from the group consisting of *Neoscapteriscus didactylus, Neoscapteriscus* spp., *Gryllotalpa Africana, Gryllotalpa* spp., and *Scapteriscus* spp.

In certain embodiments, an insect killed or impaired by the compositions herein is a Locust. (Family: Acrididae), specifically: *Schistocerca gregaria.*

In certain embodiments, an insect killed or impaired by the compositions herein is a grasshopper (Suborder: Caelifera).

In certain embodiments, an insect killed or impaired by the compositions herein is a true fly (Diptera)

In certain embodiments, an insect killed or impaired by the compositions herein is a crane fly (Family: Tipulidae), selected from the group consisting of *Tipula paludosa* and *Tipula oleracea.*

In certain embodiments, the insect killed or impaired by the compositions herein is a Fungus gnat (Family: Sciaridae)

In certain embodiments, an insect killed or impaired by the compositions herein is a Frit fly (Family: Chloropidae) selected from the group consisting of *Oscinella frit, Ocinella pusilla, Chlorops pumilionis, Chlorops oryzae, Meromyza saltatrix, Meromyza nigriventis,* and *Dicraeus* spp.

In certain embodiments, an insect killed or impaired by the compositions herein is a Hessian fly/Gall gnat (Family: Cecidomyiidae) selected from the group consisting of *Mayetiola destructor, Sitodiplosis mosellana, Orseolia oryzae, Orseolia oryzivora, Geromyia penniseti, Contarinia sorghicola, Orseolia oryzivora, Dasyneura coffeae, Asphondylia yushimai, Thecodiplosis japonensis, Contarinia lentis, Contarinia medicaginis, Dasineura ignorata, Obolodiplosis robiniae, Contarinia nasturtii, Dasineura brassicae, Contarinia pyrivora, Resseliella theobaldi, Horidiplosis ficifolii, Rhopalomyia solidaginis, Porricondylini* spp., *Lestremia* spp., *Lestodiplosis* spp., *Acaroletes* spp., *Sitodiplosis mosellana, Aphidoletes* spp., and *Arthrocnodax* spp.

In certain embodiments, an insect killed or impaired by the compositions herein is a Stem/shoot fly (Family: Muscidae) selected from the group consisting of *Atherigona naqvii, Atherigona reversura, Atherigona approximata, Atherigona pulla, Atherigona milliaceae, Atherigona soccata, Atherigona hyalinipennis, Atherigona falcata, Atherigona simplex, Atherigona atripalpis, Atherigona oryzae, Atherigona punctata,* and *Atherigona orientalis.*

In certain embodiments, an insect killed or impaired by the compositions herein is a Thrip (Thysanoptera)

In certain embodiments, an insect killed or impaired by the compositions herein is a Thrip (Family: Thripidae) selected from the group consisting of *Frankliniella occidentalis, Frankliniella schultzei, Thrips tabaci, Thrips palmi, Scirtothrips dorsalis, Heliothrips haemorrhoidalis, Stenchaetothrips biformis.*

In certain embodiments, an insect killed or impaired by the compositions herein is a Cockroach (Blattodea).

In certain embodiments, an insect killed or impaired by the compositions herein is a German cockroach (Family: Ectobiidae), specifically: *Blatella germanica.*

In certain embodiments, an insect killed or impaired by the compositions herein is a Cockroaches (Family: Blattidae) and is selected from the group consisting of *Blatta orientalis* and *Periplaneta americana.*

In certain embodiments, an insect killed or impaired by the compositions herein is a Wasp (Vespoidea)

In certain embodiments, an insect killed or impaired by the compositions herein is a Wasp (Family: Vespidae), selected form the group consisting of *Vespa vulgaris, Vespula germanica,* and *Vespa mandarinia.*

In certain embodiments, an insect killed or impaired by the compositions is a Sawfly (Symphyta).

In certain embodiments, an insect killed or impaired by the compositions herein is a Wheat stem sawfly (Family: Cephidae), specifically: *Cephus cinctus.*

In certain embodiments, an insect killed or impaired by the compositions herein is a Turnip sawfly (Family: Tenthredinidae), specifically: *Athalia rosae*.

Components of the Composition for Killing or Impairing Insects

A. Erythritol Content

In certain embodiment, erythritol is the only active ingredient. In certain embodiments, the concentration of erythritol in the composition ranges from about 0.1M to 2M. In certain embodiments, the concentration of erythritol in the composition is about 0.1M, 0.15M, 0.2M, 0.25M, 0.3M, 0.35M, 0.4M, 0.45M, 0.5M, 0.55M, 0.6M, 0.65M, 0.7M, 0.75M, 0.8M, 0.85M, 0.9M, 0.95M, 1.0M, 1.15M, 1.2M, 1.25M, 1.3M, 1.35M, 1.4M, 1.45M, 1.5M, 1.55M, 1.6M, 1.65M, 1.7M, 1.75M, 1.8M, 1.85M, 1.9M, 1.95M, or 2.0M.

In various embodiments, the erythritol in the composition is present in an amount of about 1 to about 99 weight percent (w/w) relative to the total weight of the composition. In various embodiments, the erythritol is present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 weight percent relative to the total weight of the composition.

B. Additional Components

In certain embodiments, the at least one additional component includes at least one of water, an odorant, nitrogen source, sodium salt, attractant, defoamer, dispersing agent, feeding stimulant, flavoring, surfactant, suspending agent, oil, humectant, cellulose, an emulsifier, a dispersion agent, a preservative, a suspension agent, a wetting agent, a stabilizer, and or combinations thereof.

Suitable odorants include, for example, unsaturated $C_6$ to $C_{10}$ alkenes; heterocyclic substances including pyranones, furanones, benzopyranones and benzofuranones; terpenes including hemiterpenes, monoterpenes, sesquiterpenes, diterpenes, triterpenes and retinoids; unsaturated alcohols. In the context of mosquito and biting fly control odorants could include host-associated odors including carbon dioxide ($CO_2$), 1-octen-3-ol, and 1-lactic acid, as well as floral odors including phenyacetaldehyde, heptanone, benzaldehyde, anisaldehyde, linalool, nonanone, (E)-β-ocimene, (E)-linalool oxide, β-myrcene, Hexanal, (E)-2-hexen-1-ol, β-pinene, Limonene, β-farnesene, Acetophenone, Phenylacetaldehyde, Phenylethylalcohol, sulcatone, and Nonenal. In one embodiment, the odorant is unsaturated $C_6$ to $C_{10}$ alkenes. In one embodiment, the odorant is a pyranone. In one embodiment, the odorant is a furanone. In one embodiment, the odorant is abenzopyranone. In one embodiment, the odorant is a benzofuranone. In one embodiment, the odorant is a hemiterpene. In one embodiment, the odorant is a monoterpene. In one embodiment, the odorant is a sesquiterpene. In one embodiment, the odorant is a diterpene. In one embodiment, the odorant is a triterpene. In one embodiment, the odorant is a retinoid. In one embodiment, the odorant is an unsaturated alcohol. In one embodiment, the odorant is carbon dioxide ($CO_2$). In one embodiment, the odorant is 1-octen-3-ol, In one embodiment, the odorant is 1-lactic acid. In one embodiment, the odorant is a phenyacetaldehyde. In one embodiment, the odorant is heptanone. In one embodiment, the odorant is a benzaldehyde. In one embodiment, the odorant is anisaldehyde. In one embodiment, the odorant is linalool. In one embodiment, the odorant is nonanone. In one embodiment, the odorant is (E)-2-hexen-1-ol. In one embodiment, the odorant is nonanone. In one embodiment, the odorant is β-myrcene. In one embodiment, the odorant is (E)-β-ocimene. In one embodiment, the odorant is (E)-linalool oxide. In one embodiment, the odorant is β-myrcene. In one embodiment, the odorant is Hexanal. In one embodiment, the odorant is (E)-2-hexen-1-ol, β-pinene. In one embodiment, the odorant is Limonene, β-farnesene. In one embodiment, the odorant is Acetophenone. In one embodiment, the odorant is Phenylacetaldehyde. In one embodiment, the odorant is Phenylethylalcohol. In one embodiment, the odorant is sulcatone. In one embodiment, the odorant is Nonenal.

Suitable feeding stimulants include at least one sugar, sweetener, or sugar-containing composition or sugar derivative that is not toxic to the insect. In some embodiments, the feeding stimulant is a sugar such as a monosaccharide, disaccharide, oligosaccharide, and/or combination thereof. In certain embodiments, the at least one sugar or sugar-containing composition includes honey, molasses, maltose, lactose, sucrose, glucose, fructose, and/or combinations thereof. Other suitable feeding stimulants include, for example, ergosterol, fermented milk, p-hydroquinone, hydroxyphenyl-β-D-glycopyranoside, catechol, resorcinol, fluoroglucinol, 4-methoxyphenol, 1,4-dimethoxybenzene, 4-phenoxyphenol, phenylhydroquinone, 4-benzyloxyphenol, quinhydrone, or combinations thereof.

In one embodiment, the feeding stimulant is a sugar. In one embodiment, the feeding stimulant is a sweetener. In one embodiment, the feeding stimulant is a sugar-containing composition or sugar derivative that is not toxic to the insect. In one embodiment, the feeding stimulant is a monosaccharide. In one embodiment, the feeding stimulant is a disaccharide. In one embodiment, the feeding stimulant is an oligosaccharide. In one embodiment, the feeding stimulant includes a honey. In one embodiment, the feeding stimulant includes molasses. In one embodiment, the feeding stimulant includes maltose. In one embodiment, the feeding stimulant includes lactose. In one embodiment, the feeding stimulant includes a sucrose. In one embodiment, the feeding stimulant includes a glucose. In one embodiment, the feeding stimulant includes a fructose. In one embodiment, the feeding stimulant includes ergosterol. In one embodiment, the feeding stimulant includes fermented milk. In one embodiment, the feeding stimulant includes p-hydroquinone. In one embodiment, the feeding stimulant includes hydroxyphenyl-β-D-glycopyranoside. In one embodiment, the feeding stimulant includes catechol. In one embodiment, the feeding stimulant includes resorcinol. In one embodiment, the feeding stimulant includes fluoroglucinol. In one embodiment, the feeding stimulant includes 4-methoxyphenol. In one embodiment, the feeding stimulant includes 1,4-dimethoxybenzene. In one embodiment, the feeding stimulant includes 4-phenoxyphenol. In one embodiment, the feeding stimulant includes phenylhydroquinone. In one embodiment, the feeding stimulant includes 4-benzyloxyphenol. In one embodiment, the feeding stimulant includes quinhydrone.

Suitable attractants include, for example, pheromones, pheromone mimics, 2-naphthalene-methanol, naphthalene, steroid derivatives, camphor, turpentine oil, plant volatiles, flower oils, $CO_2$ and the like. In certain embodiments, pheromones include, for example, sexual attraction, trail following, dispersion, oviposition, and alarm pheromones. In certain embodiments, the pheromone mimics include, for example, glycols. In one embodiment, the odorant is a floral odorant, which can be an extract of a plant the insect species is attracted to, or a synthetic analog of such an extract that substantially mimics the insect's response to the natural odorant. In one embodiment, the odorant is at least one insect pheromone.

In one embodiment, the attractant is a pheromone. In one embodiment, the attractant is a pheromone mimic. In one embodiment, the attractant is 2-naphthalene-methanol. In one embodiment, the attractant is naphthalene. In one embodiment, the attractant is a steroid derivative. In one embodiment, the attractant is camphor. In one embodiment, the attractant is turpentine oil. In one embodiment, the attractant is a plant volatile. In one embodiment, the attractant is a flower oil. In one embodiment, the attractant is a $CO_2$. In one embodiment, the pheromone is a sexual-attraction pheromone. In one embodiment, the pheromone is a trail following pheromone. In one embodiment, the pheromone is a dispersion pheromone. In one embodiment, the pheromone is an oviposition pheromone. In one embodiment, the pheromone is an alarm pheromone. In one embodiment, the pheromone mimic is a glycol. In certain embodiments, the attractant food bait comprises one selected from onions, sucrose, sugar, cane sugar, milk, milk powder, wheat flour, flour, cucumber, eggs, potatoes, honey mixed with fruits such as oranges, apples, grapefruit, blueberries, plums, pineapple, watermelon, grapes, mangos, and mandarins or a combination thereof.

In one embodiment, the attractant food bait comprises onions. In one embodiment, the attractant food bait comprises sucrose. In one embodiment, the attractant food bait comprises sugar. In one embodiment, the attractant food bait comprises cane sugar. In one embodiment, the attractant food bait comprises milk, In one embodiment, the attractant food bait comprises milk powder. In one embodiment, the attractant food bait comprises wheat flour, flour. In one embodiment, the attractant food bait comprises cucumber. In one embodiment, the attractant food bait comprises eggs. In one embodiment, the attractant food bait comprises potatoes. In one embodiment, the attractant food bait comprises honey mixed with fruits such as oranges, apples, grapefruit, blueberries, plums, pineapple, watermelon, grapes, mangos, or mandarins. In one embodiment, the attractant food bait comprises honey mixed with orange. In one embodiment, the attractant food bait comprises honey mixed with oranges. In one embodiment, the attractant food bait comprises honey mixed with apples. In one embodiment, the attractant food bait comprises honey mixed with grapefruits. In one embodiment, the attractant food bait comprises honey mixed with blueberries. In one embodiment, the attractant food bait comprises honey mixed with plums. In one embodiment, the attractant food bait comprises honey mixed with pineapples. In one embodiment, the attractant food bait comprises honey mixed with watermelons. In one embodiment, the attractant food bait comprises honey mixed with grapes. In one embodiment, the attractant food bait comprises honey mixed with mangos. In one embodiment, the attractant food bait comprises honey mixed with mandarins.

Suitable preservatives include, for example, benzoic acid, sodium benzoate, sorbic acid, potassium sorbate, p-hydroxybenzoates, dehydroacetic acid, glycine Among the extracts such as propionic acid, glycerin fatty acid ester, ε-polylysine, chitosan, pepper, and perilla.

In one embodiment, the preservative includes benzoic acid. In one embodiment the preservative includes sodium benzoate. In one embodiment, the preservative includes sorbic acid. In one embodiment, the preservative includes potassium sorbate. In one embodiment, the preservative includes p-hydroxybenzoates. In one embodiment, the preservative includes dehydroacetic acid. In one embodiment, the preservative includes glycine. In one embodiment, the preservative includes propionic acid. In one embodiment, the preservative includes glycerin fatty acid ester. In one embodiment, the preservative includes ε-polylysine. In one embodiment, the preservative includes chitosan, pepper. In one embodiment, the preservative includes perilla.

Suitable nitrogen sources include, for example, uric acid, amino acids, peptides, proteins, and the like.

In one embodiment, the nitrogen source is uric acid. In one embodiment, the nitrogen source is an amino acid. In one embodiment, the nitrogen source is a peptide. In one embodiment, the nitrogen source is a protein.

Suitable sodium salts include sodium chloride and sodium sulphate.

In one embodiment, the sodium salt is sodium chloride. In one embodiment, the sodium salt is sodium sulphate.

Suitable oils include, for example, palm oil (with tocopherol and tocotrienol), cedarwood oil (with cedrene), opopanax oil (with panasinsene), angelica seed oil (with alpha-angelica lactone), and capsicum fruit extracts (with pyrazines and capsaicin).

In one embodiment, the oil is palm oil (with tocopherol and tocotrienol). In one embodiment, the oil is cedarwood oil (with cedrene). In one embodiment, the oil is an opopanax oil (with panasinsene). In one embodiment, the oil is an angelica seed oil (with alpha-angelica lactone). In one embodiment, the oil is capsicum fruit extract (with pyrazines and capsaicin).

Humectants prolong droplet drying. Some humectants help partially insoluble pesticide mix with water. Examples of suitable humectant include but are not limited to glucose and molasses, fertilizer salts such as ammonium sulfate (AMS) and urea that can strongly attract water or absorb moisture from the air. Other common humectants include sugars such as fructose, trehalose, sorbitol and oligotriose, amino acids such as glycine, trimethylglycine, serine and alanine, and alcohols such as 1,3-butylene glycol, glycerin, and propylene glycol. Some surfactants also act as humectants.

In one embodiment, the humectant is glucose. In one embodiment, the humectant is molasses. In one embodiment, the humectant is ammonium sulfate (AMS). In one embodiment, the humectant is urea. In one embodiment, the humectant is fructose. In one embodiment, the humectant istrehalose. In one embodiment, the humectant is sorbitol. In one embodiment, the humectant is oligotriose. In one embodiment, the humectant is glycine. In one embodiment, the humectant is trimethylglycine. In one embodiment, the humectant is serine. In one embodiment, the humectant is alanine. In one embodiment, the humectant is 1,3-butylene glycol. In one embodiment, the humectant is glycerin. In one embodiment, the humectant is propylene glycol. In one embodiment, the humectant is a surfactant.

In certain embodiments, the emulsifiers include a mixture of alkaline earth or amine alklybenzene sulfonates with a poly-alkylene glycol alkyl or alkyl aryl ether or ester. In the alklybenzene sulfonates, poly-alkylene glycol, alkyl aryl ether, alkyl aryl ester, suitable alkyl groups include $C_{1-24}$ alkyl groups, including a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, or a $C_{24}$ alkyl group.

The dispersing agent may comprise an effervescent material which effervesces on contact with water, thereby aiding in disintegration of the solid mixture and in dispersing the pesticide in water. Example of a dispersing agent includes a mixture of an acid and a base which react in the presence of water to produce acid and a suitable inorganic base, an example being the case when the acid is citric acid and the base is sodium bicarbonate.

Instead or in addition, the dispersing agent may comprise at least one swellable substance which swells on contact with water. This swelling promotes disintegration of the solid mixture of the pesticidal composition, and consequent dispersing of the pesticide therein in water. The swellable substance may be a hydrophobic gel polymer such as polyvinylpyrrolidone.

In certain embodiments, the composition comprises a wetting agent. In certain embodiments, the wetting agent includes alcohols, nonionic surfactants, gemini surfactants, biosurfactants, phosphate surfactants and mixtures thereof.

In one embodiment, the wetting agent is an alcohol in one embodiment, the wetting agent is a nonionic surfactant. In one embodiment, the wetting agent is a gemini surfactant. In one embodiment, the waiting agent is a biosurfactant. In one embodiment, the wetting agent is phosphate surfactant.

Wetting agents suitable for use in the solid compositions of this invention include any of the conventional wetting agents which are well known in the art. In particular, anionic wetting agents such as sodium N-methyl-N-oleyoyltaurate, octylphenoxy polyethoxy ethanol, nonylphenoxy polyethoxy ethanol, sodium dioctyl sulfosuccinate, sodium dodecyl benzyl sulfonate, sodium lauryl sulfonate, sodium alkyl naphthalene sulfonate, sodium sulfonated alkyl carboxylate and the like and mixtures thereof are preferred, sodium alkyl naphthalene sulfonate and sodium sulfonated alkyl carboxylate.

In one embodiment, the wetting agent is sodium N-methyl-N-oleyoyltaurate. In one embodiment, the wetting agent is octylphenoxy polyethoxy. In one embodiment, the wetting agent is ethanol. In one embodiment, the wetting agent is nonylphenoxy polyethoxy ethanol.

In one embodiment, the wetting agent is sodium dioctyl sulfosuccinate. In one embodiment, the wetting agent is sodium dodecyl benzyl sulfonate. In one embodiment, the wetting agent is sodium lauryl sulfonate. In one embodiment, the wetting agent is sodium alkyl naphthalene sulfonate. In one embodiment, the wetting agent is sodium sulfonated alkyl carboxylate. In one embodiment, the wetting agent is sodium alkyl naphthalene sulfonate. In one embodiment, the wetting agent is sodium sulfonated alkyl carboxylate. In the a sodium sulfonated alkyl carboxylate, sodium alkyl naphthalene sulfonate, and sodium sulfonated alkyl carboxylate, suitable alkyl groups include $C_{1-24}$ alkyl groups, including a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, or a $C_{24}$ alkyl group.

Suitable anionic organic surfactants include alkali metal soaps of higher fatty acids, alkyl aryl sulphonates, for example sodium dodecyl benzene sulphonate. long chain (fatty) alcohol sulphates, olefin sulphates and sulphonates, sulphated monoglycerides, sulphated esters, sulphonated ethoxylated alcohols, sulphosuccinates, alkane sulphonates, phosphate esters, alkyl isethionates, alkyl taurates and/or alkyl sarcosinates.

In one embodiment, the surfactant is an alkali metal soap of higher fatty acids. In one embodiment, the surfactant is an alkyl aryl sulphonates. In one embodiment, the surfactants is sodium dodecyl benzene sulphonate. In one embodiment, the surfactants is a long chain (fatty) alcohol sulphate. In one embodiment, the surfactant is an olefin sulphate. In one embodiment, the surfactant is an olefin sulphonate. In one embodiment, the surfactant is a sulphated monoglycerides. In one embodiment, the surfactant is a sulphated ester. In one embodiment, the surfactant is a sulphonated ethoxylated alcohol. In one embodiment, the surfactant is s sulphosuccinate. In one embodiment, the surfactant is an alkane sulphonate. In one embodiment, the surfactant is a phosphate ester. In one embodiment, the surfactant is an alkyl isethionate. In one embodiment, the surfactant is an alkyl taurate. In one embodiment, the surfactant is an alkyl sarcosinate. In the higher fatty acids, suitable alkyl groups include $C_{5-24}$ alkyl groups, including a $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, or a $C_{24}$ alkyl group.

Suitable cationic organic surfactants include alkylamine salts, quaternary ammonium salts, sulphonium salts and phosphonium salts. In one embodiment, the surfactant is an alkylamine salt. In one embodiment, the surfactant is a quaternary ammonium salt. In one embodiment, the surfactant is a sulphonium salt. In one embodiment, the surfactant is a phosphonium salt. In the alkylamine salts, suitable alkyl groups include $C_{1-24}$ alkyl groups, including a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, or a $C_{24}$ alkyl group.

Suitable nonionic surfactants include silicones such as siloxane polyoxyalkylene copolymers, condensates of ethylene oxide with a long chain (fatty) alcohol or (fatty) acid, for example $C_{14-15}$ alcohol, condensed with 7 moles of ethylene oxide (Dobanol® 45-7), condensates of ethylene oxide with an amine or an amide, condensation products of ethylene and propylene oxides, esters of glycerol, sucrose or sorbitol, fatty acid alkylol amides, sucrose esters, fluorosurfactants and fatty amine oxides.

In one embodiment, the surfactant is a siloxane polyoxyalkylene copolymers. In one embodiment, the surfactant is a condensate of ethylene oxide with a long chain (fatty) alcohol or (fatty) acid; for example, $C_{14-15}$ alcohol, condensed with 7 moles of ethylene oxide (Dobanol® 45-7). In one embodiment, the surfactant is a condensates of ethylene oxide with an amine or an amide. In one embodiment, the surfactant is a condensation product of ethylene and propylene oxide. In one embodiment, the surfactant is an ester of glycerol. In one embodiment, the surfactant is sucrose or sorbitol. In one embodiment, the surfactant is a fatty acid alkylol amide. In one embodiment, the surfactant is a sucrose ester In one embodiment, the surfactant is a fluorosurfactant. In one embodiment, the surfactant is a fatty ammine oxide.

Suitable amphoteric organic detergent surfactants include imidazoline compounds, alkylaminoacid salts and betaines. Of particular interest are surfactants which are environmentally acceptable.

In one embodiment, the surfactant is an imidazoline compound. In one embodiment, the surfactant is an alkylaminoacid salt. In one embodiment, the surfactant is a betaine.

In certain embodiments, the surfactant is coco glucoside, decyl glucoside, lauryl glucoside, sucrose cocoate, caprylyl/capryl glucoside.

In one embodiment, the surfactant is coco glucoside. In one embodiment, the surfactant is decyl glucoside. In one embodiment, the surfactant is lauryl glucoside. In one embodiment, the surfactant is sucrose cocoate. In one embodiment, the surfactant is caprylyl/capryl glucoside In certain embodiments, the stabilizer includes but are not limited to proteins, polysaccharides and derivatives thereof. In particular, stabilizers include but are not limited to acacia gum, agar, alginic acid and its derivatives, alginate derivatives (includes but is not limited to ammonium alginate, calcium alginate, potassium alginate, sodium alginate and propylene glycol alginate), arabic gum, carboxymethylcellulose, carrageenan, gelatine, glycerol, glycogen, guar gum, karaya gum, locust bean gum, mannitol, pectin and its derivatives, saponin or its derivatives, tara gum, tragacanth gum and xanthan gum.

In one embodiment, the stabilizer is a protein. In one embodiment, the stabilizer is a polysaccharide or a derivative thereof. In one embodiment, the stabilizer is acacia gum. In one embodiment, the stabilizer is agar. In one embodiment, the stabilizer is alginic acid or its derivative. In one embodiment, the stabilizer is ammonium alginate. In one embodiment, the stabilizer is calcium alginate. In one embodiment, the stabilizer is potassium alginate. In one embodiment, the stabilizer is sodium alginate. In one embodiment, the stabilizer is propylene glycol alginate. In one embodiment, the stabilizer is arabic gum. In one embodiment, the stabilizer is carboxymethylcellulose. In one embodiment, the stabilizer is carrageenan. In one embodiment, the stabilizer is gelatin. In one embodiment, the stabilizer is glycerol. In one embodiment, the stabilizer is glycogen. In one embodiment, the stabilizer is guar gum. In one embodiment, the stabilizer is karaya gum. In one embodiment, the stabilizer is locust bean gum. In one embodiment, the stabilizer is mannitol. In one embodiment, the stabilizer is pectin or its derivative. In one embodiment, the stabilizer is saponin or its derivative. In one embodiment, the stabilizer is tara gum. In one embodiment, the stabilizer is tragacanth gum. In one embodiment, the stabilizer is xanthan gum.

In certain embodiments, the composition comprises thickeners that help volatile pesticides become less volatile, they also cause the carrier solution to become more viscous and heavier. Non-limiting examples of thickeners include polyacrylamide, polyethylene polymers, polysaccharides (long-chain sugars), or vegetable oils. thickeners help reduces drift, odor, and waste.

In one embodiment, the thickener is a polyacrylamide. In one embodiment, the thickener is a polyethylene polymer. In one embodiment, the thickener is a polysaccharide (long-chain sugar). In one embodiment, the thickener is a vegetable oil.

Polysaccharides can also be thickening agents and gelling agents in the compositions/formulations of the present invention.

In certain embodiments, the thickener is one selected from the group consisting of monosodium alkylamine dicarboxylate, sodium gluconate, trisodium citrate, and sodium chloride, wherein the alkylamine dicarboxylate comprises a $C_{1-24}$ alkyl amine.

The compositions described herein can be in the form of gels. Suitable gel-forming components include acrylic thickeners such as carboxyl vinyl polymers, cellulose thickeners such as cellulose gel and hydroxyethyl cellulose, carrageenan, kaolinite, nacrite, and dickite, halloysite, antigolite, amesite, clonstedite, talc pyrophyllite group such as pyrophyllite, illite, sea green stone, ceradonite, sericite, muscovite, vermiculite, montmorillonite, beidellite, nontronite, saponite, laponite, hectorite, and the like.

In one embodiment, the gel-forming component is an acrylic thickener. In one embodiment, the gel-forming component is a carboxyl vinyl polymer. In one embodiment, the gel-forming component is a cellulose thickener. In one embodiment, the gel-forming component is a cellulose gel. In one embodiment, the gel-forming component is hydroxyethyl cellulose. In one embodiment, the gel-forming component is carrageenan. In one embodiment, the gel-forming component is kaolinite. In one embodiment, the gel-forming component is nacrite. In one embodiment, the gel-forming component is dickite. In one embodiment, the gel-forming component is halloysite. In one embodiment, the gel-forming component is antigolite. In one embodiment, the gel-forming component is amesite. In one embodiment, the gel-forming component is clonstedite. In one embodiment, the gel-forming component is a talc pyrophyllite group. In one embodiment, the gel-forming component is pyrophyllite. In one embodiment, the gel-forming component is illite. In one embodiment, the gel-forming component is sea green stone. In one embodiment, the gel-forming component is ceradonite. In one embodiment, the gel-forming component is sericite. In one embodiment, the gel-forming component is muscovite. In one embodiment, the gel-forming component is vermiculite. In one embodiment, the gel-forming component is montmorillonite. In one embodiment, the gel-forming component is beidellite. In one embodiment, the gel-forming component is nontronite. In one embodiment, the gel-forming component is saponite. In one embodiment, the gel-forming component is laponite. In one embodiment, the gel-forming component is hectorite.

In certain embodiment, the additional component is bacteriostat, bactericide, an anti-freeze.

In one embodiment, the additional component is ethyl alcohol. In one embodiment, the additional component is isopropyl alcohol. In one embodiment, the additional component is t-octylphenoxypolyethoxyethanol. In one embodiment, the additional component is polyoxyethylenesorbitan. In one embodiment, the additional component is an organosilicate. In one embodiment, the additional component is water. In one embodiment, the additional component is a Pyrethrin. In one embodiment, the additional component is Tannic acid. In one embodiment, the additional component is piperonyl butoxide. In one embodiment, the additional component is Polyoxy ethylene ether. In one embodiment, the additional component is hydrocarbons, including $C_{10}$ hydrocarbons and/or $C_{10}$ aromatics, and <1% naphatalene. In one embodiment, the additional component is mixture of calcium alkyl benzene sulfonate and sodium lauryl sulphate. In one embodiment, the additional component is Sodium lauryl sulphate. In one embodiment, the additional component is Polyfon H. In one embodiment, the additional component is lignosulfonic acid. In one embodiment, the additional component is a sodium salt. In one embodiment, the additional component is Toximul SEE 341. In one embodiment, the additional component is Bio-Soft N411. In one embodiment, the additional component is Resole 12111 A blue dye. In one embodiment, the additional component is BN200 L. In one embodiment, the additional component is Supragil WP. In one embodiment, the additional component is C 9 Petroleum Distillate. In one embodiment, the additional component is Phthalic acid dibutyl ester. In one embodiment, the additional component is Calcium dodecylbenzene sulfonate (anionic surfactant). In one embodiment, the additional component is a Propellent hydrocarbon. In one embodiment, the additional component is 3,5-di-tert-butyl-4-hydroxytoluol. In one embodiment, the additional component is sodium benzoate. In one embodiment, the additional component is Aromatic hydrocarbon (aromatic solvent). In one embodiment, the additional component is Aromatic petroleum solvent 5150. In one embodiment, the additional component is Chinafill BSK-H. In one embodiment, the additional component is Benzenesulfonic acid. In one embodiment, the additional component is Mono$C_{10-13}$-alkyl derivative. In one embodiment, the additional component is Citric Acid. In one embodiment, the additional component is Platyphyllol (natural or synthetic). In one embodiment, the additional component is Citronella oil. In one embodiment, the additional component is Antifoam 1520. In one embodiment, the additional component is coconut diethanolamide. In one embodiment, the additional component is Proxel XL 2. In one embodiment, the additional component is Corn syrup solids. In one embodiment, the additional component is Shellsol A100. In one embodiment, the additional component is Crex Brunner Mond Group plc sodium sesquicarbonate. In one embodiment, the additional component is Sodium dodecyl benzene sulfonate. In one embodiment, the additional component is naphthalenesulfonic acid formaldehyde. In one embodiment, the additional component is Emulsifier Teva-8905-C. In one embodiment, the additional component is Stepsol C-25. In one embodiment, the additional component is Adjuvant thiamine. In one embodiment, the additional component is tween-80 Polyoxyethylene (20) sorbitan monooleate). In one embodiment, the additional component is OT-B Cyanamid sodium dioctylsulfosuccinate. In one embodiment, the additional component is Tensiofix B 7453. In one embodiment, the additional component is Vanisperse CB. In one embodiment, the additional component is Petroleum oil. In one embodiment, the additional component is S-10 (Main component: Poly(dimethylsiloxane). In one embodiment, the additional component AG BRN 85. In one embodiment, the additional component is Polyfon H. In one embodiment, the additional component is Agrilan 789. In one embodiment, the additional component is Polyfon H Westvaco sodium lignosulfonate. In one embodiment, the additional component is Geronol FF/4-E. In one embodiment, the additional component is Polyoxyethylene styrylphenyl ether (non-ionic surfactant). In one embodiment, the additional component is Proxel GXL. In one embodiment, the additional component is Glycerin. In one embodiment, the additional component is AntifoamGEN. In one embodiment, the additional component is glycerol. In one embodiment, the additional component is Shellsol A. In one embodiment, the additional component is Alpha Cypermethrin. In one embodiment, the additional component is sodium acetate. In one embodiment, the additional anhydrous Hoechst sodium acetate, anhydrous. In one embodiment, the additional component is talc. In one embodiment, the additional component is kaolin. In one embodiment, the additional component is diatomaceous earth. In one embodiment, the additional component is sodium chloride. In one embodiment, the additional component is Isopropanol. In one embodiment, the additional component is sodium Gluconate. In one embodiment, the additional component is Kelzan. In one embodiment, the additional component is aqueous solution of monosodium salt of Alkylamine decarboxylate. In one embodiment, the additional component is lactose. In one embodiment, the additional component is Lavender oil. In one embodiment, the additional component is Madeol X80. In one embodiment, the additional component is Supragil MNS/90. In one embodiment, the additional component is an anti-caking agent such as for e.g. silica gel. In one embodiment, the additional component is sodium lignosulfonate. In one embodiment, the additional component is sodium dodecylsulfate. In one embodiment, the additional component is Symperonic PE/P 75. In one embodiment, the additional component is 1,2-proppylene Glycol. In one embodiment, the additional component is Tensiofix B 7438. In one embodiment, the additional component is Moussex 998 HL. In one embodiment, the additional component is N-Methylpyrrolidon. In one embodiment, the additional component is trisodium citrate. In one embodiment, the additional component is N-octyl bicycloheptene dicarboxamide. In one embodiment, the additional component is Vynamon Blue SA-FW (501510) HeubachBlue pigment 15.1 (colour index 74160). In one embodiment, the additional component is an organic impurity. In one embodiment, the additional component is Permethin. In one embodiment, the additional component is white clay (kaolin). In one embodiment, the additional component is mixture of Dioctyl sodium sulfosuccinate and sodium benzoate. In one embodiment, the additional component is Moussex 3032 HPF.

In one embodiment, the additional component is a functional equivalent of any of the aforementioned additional component.

The various additional components in the formulation are, in some embodiments, multi-functional. For example, and without limitation, a component can be both an emulsifier and a stabilizer.

Each of the additive agents described herein can be present in the composition in an amount of about 0.005% to about 95% (w/w) or (w/v), or (v/v). In certain embodiments, each additive component, such as one or more odorants, nitrogen sources, sodium salts, attractants, defoamers, dispersing agents, feeding stimulants, flavorings, surfactants, suspending agents, oils, humectants, celluloses, emulsifiers, dispersion agents, suspension agents, wetting agents, or stabilizers, is independently present in an amount of about 0.005%, 0.01%, 0.015%, 0.02%, 0.025%, 0.03%, 0.035%, 0.04%, 0.045%, 0.05%, 0.055%, 0.06%, 0.065%, 0.07%, 0.075%, 0.08%, 0.085%, 0.09%, 0.095%. 0.1, 0.5, 1%, 1.5, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, 41.0%, 41.5%, 42.0%, 42.5%, 43.0%, 43.5%, 44.0%, 44.5%, 45.0%, 45.5%, 46.0%, 46.5%, 47.0%, 47.5%, 48.0%, 48.5%, 49.0%, 49.5%, 50.0%, 50.5%, 51.0%, 51.5%, 52.0%, 52.5%, 53.0%, 53.5%, 54.0%, 54.5%, 55.0%, 55.5%, 56.0%, 56.5%, 57.0%, 57.5%, 58.0%, 58.5%, 59.0%, 59.5%, 60.0%, 60.5%, 61.0%, 61.5%, 62.0%, 62.5%, 63.0%, 63.5%, 64.0%, 64.5%, 65.0%, 65.5%, 66.0%, 66.5%, 67.0%, 67.5%, 68.0%, 68.5%, 69.0%, 69.5%, 70.0%, 70.5%, 71.0%, 71.5%, 72.0%, 72.5%, 73.0%, 73.5%, 74.0%, 74.5%, 75.0%, 75.5%, 76.0%, 76.5%, 77.0%, 77.5%, 78.0%, 78.5%, 79.0%, 79.5%, 80.0%, 80.5%, 81.0%, 81.5%, 82.0%, 82.5%, 83.0%, 83.5%, 84.0%, 84.5%, 85.0%, 85.5%, 86.0%, 86.5%, 87.0%, 87.5%, 88.0%, 88.5%, 89.0%, 89.5%, 90.0%, 90.5%, 91.0%, 91.5%, 92.0%, 92.5%, 93.0%, 93.5%, 94.0%, 94.5%, or about 95% (w/w) or (w/v), or (v/v).

C. Composition Delivery Systems

In certain embodiments, the composition is in a solid form such as, for example, dry powder, pellet, granular and wettable powder, capsules, and water dispersible granules.

In certain embodiments, the composition is in a fluid form such as, for example, micro-emulsions, emulsifiable concentrate, liquid, aerosol, suspension concentrate, or gel. In certain embodiments, the fluid formulation has a viscosity that allows it to be injectable and so that it can be deployed using a syringe or a caulking gun. In certain embodiments, the viscosity of the formulation is such that it can be deployed using sprinkler, furrow, drip (trickle), or border irrigation systems, row crop sprayers, trailed crop sprayers, low volume mist blowers, hydraulic sprayers, compressed air sprayers, and the like.

In certain embodiments, the composition is applied on a bait station comprising a supporting material such as for example cellulose, natural fibers, synthetic fibers, metal, glass, or plastic. Suitable sources of cellulose include paper or wood. In certain embodiments, the cellulose is methyl cellulose. The wood can be any suitable wood that is attractive to termites, including red pine, black pine, bay pine, hemlock, cedar sapwood, hippopotamus, maple, poplars and the like.

The compositions described herein may be placed in a suitable bait trap or bait station typically used for a particular insect and known in the art. In various embodiments, the bait is a cellulose containing material that has absorbed erythritol and one or more additional components.

The compositions described herein can be applied using a spray bottle capable of producing a mist or aerosol of the compositions described herein. Spray bottles can be made from plastics such as polyethylene (PE), polypropylene (PP), polyethylene terephthalate (PET), or glass.

Methods of Killing or Impairing Insects

In certain embodiments, a method of killing or impairing insects is provided. The method includes contacting the composition with one or more of the insect species described herein. In various embodiments, the method also includes providing a bait station containing the composition in an area having one or more of the aforementioned insect species. In various embodiments, the method also includes depositing the composition on a surface, such as a plant or soil. Because the composition described herein is not toxic to humans, it can be deposited on any food crop in a suitable setting, such as a garden or field.

Deposition can include spraying a concentrate either pre-diluted with water or diluted with water concurrently with application of the composition.

In various embodiments, the method includes killing or impairing termites

The method of killing or reducing longevity of a termite can be accomplished by any of the delivery routes described herein, such as fluid formulations, wood traps, pellets, and the like.

Kits:

The invention includes a kit comprising a composition comprising erythritol, an applicator, and an instructional material for use thereof. The instructional material included in the kit comprises instructions for killing or impairing an insect without substantially harming a mammal. The instructional material recites the amount of, and frequency with which, the composition should be contacted with the insect for its consumption by the insect. In other embodiments, the kit further comprises at least one additional agent that kills or impairs the insect. In other embodiments, the kit further comprises at least one sugar, sweetener or sugar-containing composition or sugar derivative that is not toxic to the insect.

Those skilled in the art will recognize or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The invention is now described with reference to the following materials and methods. These materials and methods are provided for the purpose of illustration only, and the invention is not limited to these experiments, but rather encompasses all variations that are evident as a result of the teachings provided herein.

EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples, therefore, specifically point out the preferred embodiments of the present invention, and are not to be construed as limiting in any way the remainder of the disclosure.

An insect bait composition, comprising an insecticide of 10 to 50% Erythritol and attractant food baits that can comprise of a single or multiple mixture of 50 to 90% from onions, sucrose, sugar, cane sugar, milk, milk powder, wheat flour, flour, cucumber, eggs, potatoes, honey mixed with fruits such as oranges, apples, grapefruit, blueberries, plums, pineapple, watermelon, grapes, mangos, mandarins are mixed to form a dry composition and 25-35 wt % of water is added to the dry composition to form a paste or putty.

Experimental Methods

*Drosophila* Culturing and Sample Sizes:

All animals were cultured at 25° C., kept at 50-60% humidity, and were raised under a standard 12:12 light dark cycle. For each experimental treatment, n=30 flies were tested in groups of 10 per tube, and three tubes per treatment. Tubes were kept on their side to minimize subject becoming mired in the food. Foods were replaced twice a week. The total number of fruit flies used for these experiments was 780, with 300 used for two initial trials testing mortality among store-brand sweeteners, 210 used for repeating this with blue dye and pure erythritol, 120 for choice trials and 150 for concentration trials.

Standard *Drosophila* food for larval culturing consisted of water, cornmeal, yeast, molasses, and agar, as previously described (Chakraborty, et al., 2011, PLoS ONE 6: e20799). A similar food (without molasses) also served as the base to which treatments were added. The addition of cornmeal and yeast assured the flies still received sufficient carbohydrates and protein in addition to any effects of the treatment additives.

Drosophila food was combined with an equal weight/volume (0.0238 g/ml) of one non-nutritive sweetener (TRUVIA, EQUAL, SPLENDA, SWEET'NLOW, or PUREVIA) or a control nutritive sweetener (controls: sucrose or corn syrup). Wild type (Canton S) larvae were initially raised on the standard food, and 0-12 hour old adult flies were transferred to foods containing one non-nutritive sweetener or a control treatment. The longevity of flies raised on food containing an equal weight/volume (0.0238 g/ml) of each of these sweeteners were compared to control foods. Experimenters were blinded to treatments when assessing mortality and climbing ability. The exception was corn syrup, as it is not a white solid and can therefore be texturally discerned. 0-24 hour-old Drosophila were placed on these foods and observed for 65 days. This procedure was repeated with foods containing brilliant blue FCF (Fisher 50-727-25) in 5% weight/volume concentration (Wong, et al., 2009, PLoS One 4: e6063), as well as erythritol, sucrose, corn syrup, TRUVIA, EQUAL or PUREVIA as treatments. Flies were then examined daily for externally visible blue guts. Longevity assays and climbing behavioral assays were performed as previously described (Chakraborty, et al. 2011, PLoS ONE 6: e20799). The number of dead flies were scored daily. Climbing behavior was assayed every second day. For climbing assays, a modified version of Le Bourg and Lints was used (Le Bourg, 1992, Gerontology 38: 71-79). Groups of 10 or fewer flies were transferred to a clean, empty vial and given 18 seconds to climb 5 cm. The number of flies that successfully reach the 5 cm line were recorded.

Concentration Trials:

Standard fly foods were prepared as previously described, and then were treated with 2M, 1M, 0.5M and 0.1M concentrations of erythritol, using 0.5M sucrose as control. 0 to 24 hour-old Drosophila were placed on these foods and mortality was recorded daily for 35 days as above.

Choice Experiments:

Foods containing 2 M erythritol, 1M erythritol and 1M sucrose were prepared for paired presentations in open choice tests. In each treatment one food type contained 0.05% brilliant blue FCF (Fisher 50-727-25). The blue dye allowed visual confirmation of feeding on the dyed food in the pair. The flies were presented with access to two food choices by using a modified cotton stopper with approximately a 1.5 cm diameter hole to connect each pair of food tubes.

Three choice trial groups were set up: the first was between blue 1M erythritol and non-blue 1M erythritol foods (blue guts would confirm the blue dye did not inhibit feeding and confirm erythritol was being consumed), the second was between blue 1M erythritol and non-blue 1M sucrose foods (blue guts would confirm erythritol was being consumed in the presence of sucrose), and the third was a choice between blue 1M sucrose and non-blue 1M sucrose, as a negative control (blue guts would confirm the blue dye did not inhibit feeding). The final choice treatment was between blue 2M erythritol food and non-blue 1M sucrose food (this treatment provides a comparison with the 1M erythritol/1M erythritol treatment as a test of dilution of toxicity by alternative food sources; blue guts would confirm erythritol was being consumed in the presence of sucrose). The number of flies with visible blue gut contents and mortality daily were recorded for 30 days.

Statistics:

Analyses were conducted with SPSS software v. 20 (IBM corporation 2011). Fly longevity data were analyzed using survival analysis with right-hand censoring of subjects that lived to the end of the study or were lost for reasons other than death. Test were run for differences in survival distributions [Pr(flies alive) versus insect age] using the log-rank (Mantel-Cox) test to make all pairwise comparisons among treatments within each experiment.

Differences among treatments in the percent of living flies that succeeded in the climbing assay on day seven were tested using Fisher's exact test (two-tailed).

The following results and discussion further illustrate aspects of the present invention. However, they are in no way a limitation of the teachings or disclosure of the present invention as set forth herein.

Example 1: Comparisons of Effects of Non-Nutritive Sweeteners

The effects of adding five different non-nutritive sugar substitutes (TRUVIA, EQUAL, SPLENDA, SWEET'NLOW, and PUREVIA; see FIG. 7 for the active non-caloric sweeteners and chemical structures in each sugar substitute) to standard lab culturing Drosophila food (Chakraborty, et al., 2011, PLoS ONE 6: e20799) were analyzed.

Figure 1:
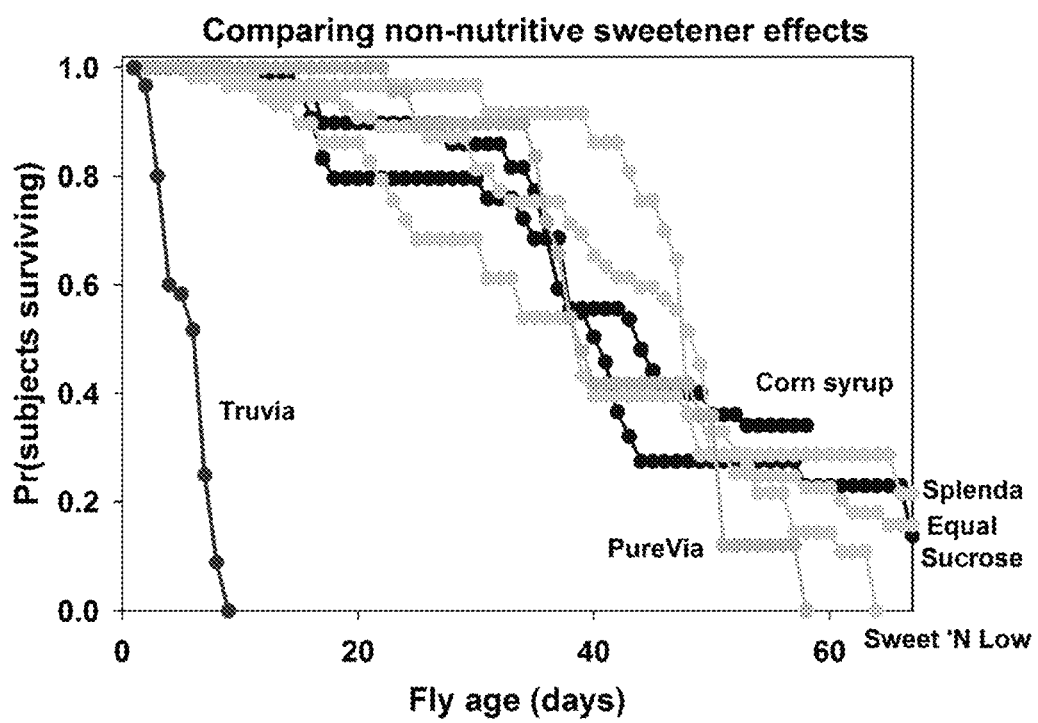
FIG. 1 is a graph illustrating the finding that *Drosophila melanogaster* raised on food containing TRUVIA show decreased longevity. The graph illustrates percentage of living adult flies raised on food containing various nutritive sugars and non-nutritive sweeteners over time. Note significant decrease in longevity of adult flies raised on food containing TRUVIA compared to other food. 300 total flies were used in these experiments.

Adult flies raised on food containing TRUVIA showed a significant reduction in longevity (FIG. 1) compared to adult flies raised on control nutritive sweeteners, both $X^2 > 76.0$; both $p < 0.001$), PUREVIA (FIG. 1, $X^2 = 76.3$, $p < 0.001$), and compared to other non-nutritive sweeteners (FIG. 1, all $X^2 > 73.0$, all $p < 0.001$). No other treatments differed significantly (all $X^2 < 3.4$, all $p > 0.06$) except Splenda vs. Sweet 'N Low ($X^2 = 6.1$, $p = 0.01$).

While the mean longevity for flies raised on control and experimental foods without TRUVIA was between 38.6+3.2SE and 50.6+2.9SE days, the mean longevity of flies raised on food containing TRUVIA was 5.8+0.3SE days.

Example 2: Effects on Motor Coordination

Figure 2:
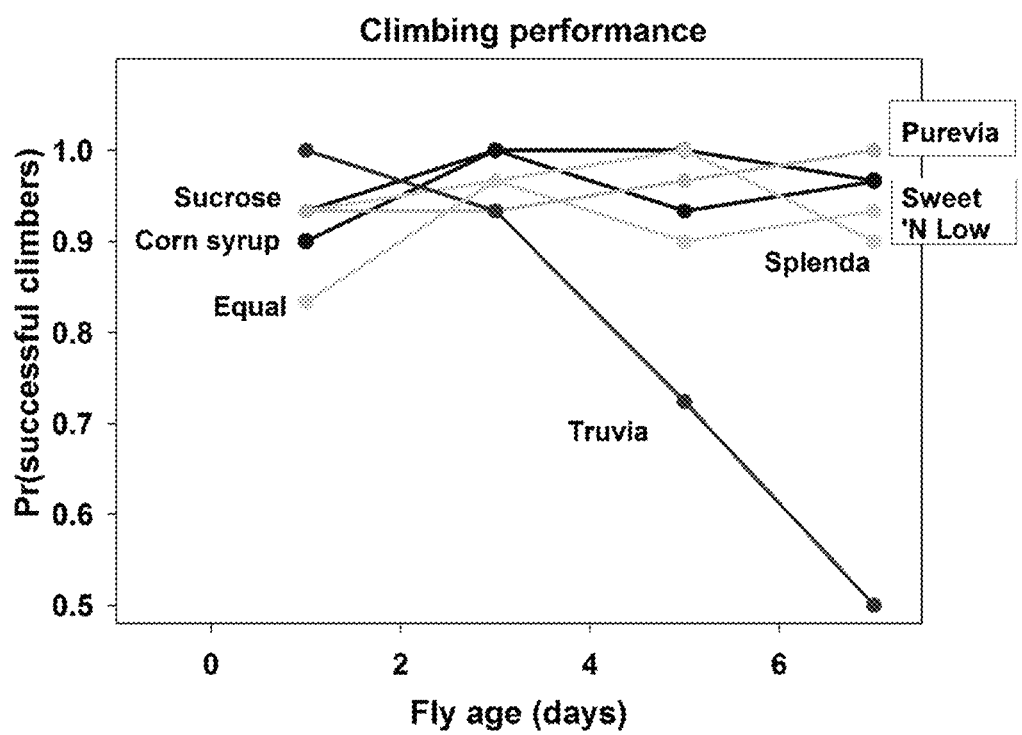
FIG. 2 is a graph illustrating the finding that *Drosophila melanogaster* raised on food containing TRUVIA show decreased motor behavior. The graph illustrates climbing ability of adult flies raised on food containing different nutritive sugars and non-nutritive sweeteners over time. There was significant decrease in climbing behavior of adult flies raised on food containing TRUVIA compared to other food. 300 total flies were used in these experiments.

Adult flies raised on food containing TRUVIA displayed aberrant motor control prior to death. Motor reflex behavior was thus assayed through climbing assays. Flies raised on food containing TRUVIA showed a significantly decreased ability to climb by day 7 (FIG. 2) compared to flies raised on control nutritive foods (FIG. 2, Fisher's exact test, both $p = 0.0006$), PUREVIA (FIG. 2, $p < 0.0001$), and compared to other non-nutritive sweeteners (FIG. 2, all $p < 0.007$). No other treatments differed from each other (all $p > 0.24$).

Taken together with the longevity studies, these data suggested some component of the non-nutritive sweetener TRUVIA was toxic to adult Drosophila melanogster, affecting both motor function and longevity of this insect.

Example 3: Tests of Erythritol as the Toxic Agent

The initial analysis of sweeteners included two sweeteners that contained extracts from the stevia plant, TRUVIA and PUREVIA (FIG. 7). While adult flies raised on food containing TRUVIA showed a significant decrease in longevity compared to controls, adult flies raised on food containing PUREVIA did not show a significant decrease in longevity compared to controls (both $X^2 < 1.1$, both $p > 0.30$, FIG. 1). These data suggest stevia plant extract was not the toxic element in these sweeteners. PUREVIA contains dextrose as a bulk component, while TRUVIA contains erythritol as a bulk component. Erythritol is a four-carbon polyol that is marketed as a non-nutritive sweetener (Moon, H., et al., 2010, Appl Microbiol Biotechnol 86:1017-1025) (FIG. 7).

Figure 3:
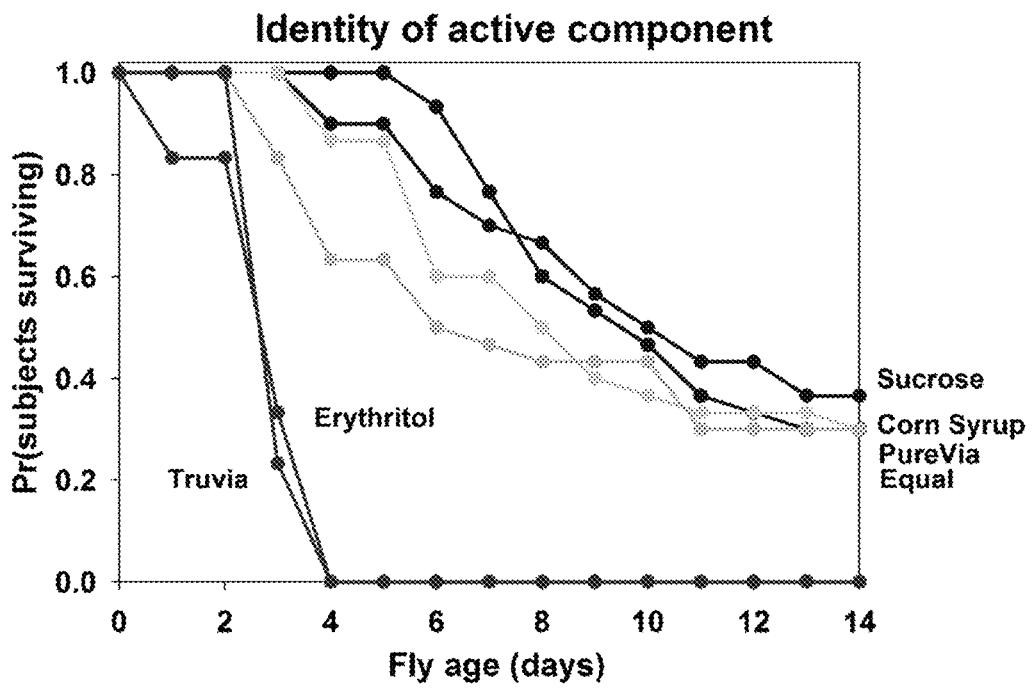
FIG. 3 is a graph illustrating the finding that *Drosophila melanogaster* raised on food containing erythritol show decreased longevity. The graph illustrates percentage of living adult flies raised on food containing various nutritive sugars and non-nutritive sweeteners over time. There was significant decrease in longevity of adult flies raised on food containing either TRUVIA or erythritol compared to other food. 210 total flies were used for these experiments.

To determine if erythritol was the toxic component of TRUVIA, the longevity studies were repeated on food containing equal weight/volume (0.0238 g/ml) of nutritive sugar controls, TRUVIA, PUREVIA, EQUAL, and erythritol. The flies were successfully eating the foods containing these sweeteners through dye labelling the food with a non-absorbed blue dye (Wong, et al., 2009, PLoS One 4: e6063) (blue food), and visual confirmation of blue food present in fly abdomens and proboscises (FIGS. 8A-8B). All subject flies in all treatments had visibly blue abdomens throughout the study, confirming all treatment foods were consumed by adult flies, and suggesting mortality was not due to food avoidance and starvation. Adult flies raised on food containing both TRUVIA and erythritol (FIG. 3) showed similar significant decreases in longevity compared to adult flies that were raised on either PUREVIA (FIG. 3, both $X^2>31.4$, both $p<0.001$) or EQUAL (FIG. 3, both $X^2>53.3$, both $p<0.001$), or on the nutritive controls sucrose and corn syrup (FIG. 3, all $X^2>54.1$, all $p<0.001$). Fly longevity did not differ between the erythritol and TRUVIA treatments ($X^2=0.013$, $p=0.91$). These data suggest the erythritol within TRUVIA was the toxic component.

Example 4: Dose-Response Analysis of Erythritol Effects on Fly Longevity

Previous analyses were performed using equal weight/volume concentrations (0.0238 g/ml) of nutritive and non-nutritive sweeteners. To assess the utility of erythritol as an insecticide, the longevity studies were repeated using erythritol at varying concentrations to determine erythritol's dose response.

Figure 4:
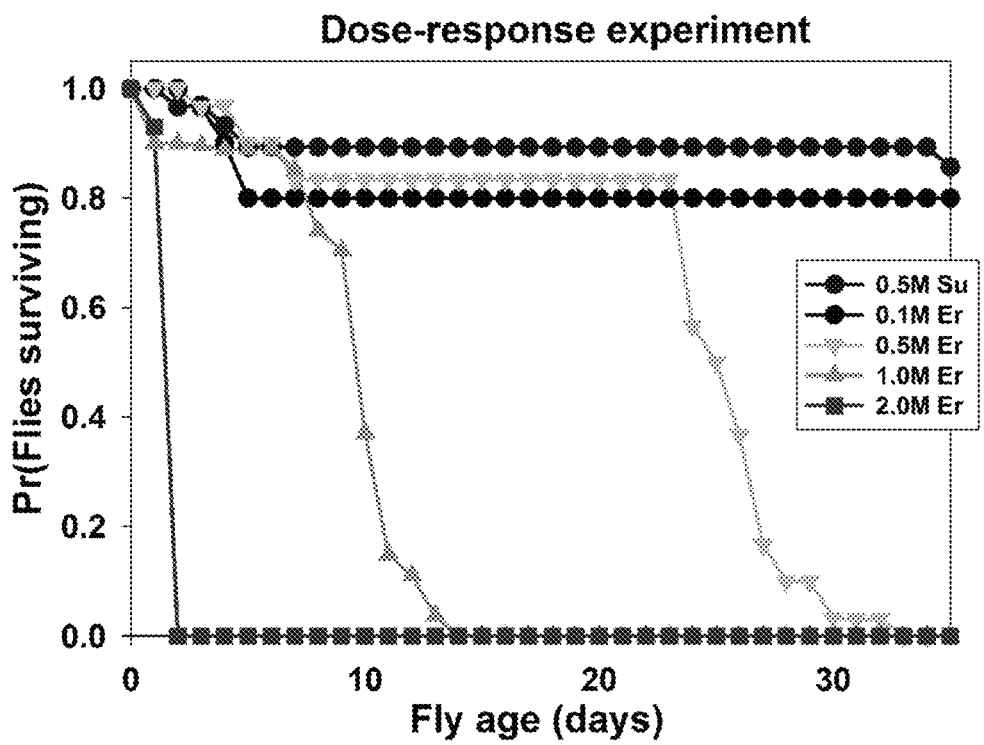
FIG. 4 is a graph illustrating the finding that increasing concentrations of erythritol show decreased longevity in *Drosophila melanogaster*. The graph illustrates percentage of living adult flies raised on food containing different concentrations of erythritol. Control food was 0.5M sucrose. 2M erythritol; 1M erythritol; 0.5M erythritol and 0.1M erythritol were tested. There was significant decrease in longevity of adult flies as concentration of erythritol was increased. 150 total flies were used for these experiments.

The effect of 0.1M, 0.5M, 1.0M and 2.0M erythritol-containing food on fly longevity was assessed. Adult flies showed a dose-dependent reduction in longevity when raised on food containing increasing concentrations of erythritol (FIG. 4). Food containing 2M concentrations of erythritol showed a significant and severe effect on longevity compared to all other treatments (all $X^2>37.6$, all $p<0.001$), although 1M and 0.5M also showed significant reductions in longevity compared to flies raised on control food containing 0.5M sucrose (both $X^2>42.1$, both $p<0.001$). Flies fed 0.5M erythritol lived longer than flies in the 1M erythritol treatment ($X^2=34.8$, $p<0.001$). Flies raised on 0.1M erythritol showed no significant difference in longevity compared to flies raised on control food when observations were terminated at 35 days subject fly age. Taken together, these data suggest increasing dosage of erythritol reduced fly longevity according to concentration.

Example 5: Palatability of Food Containing Erythritol

Figure 5:
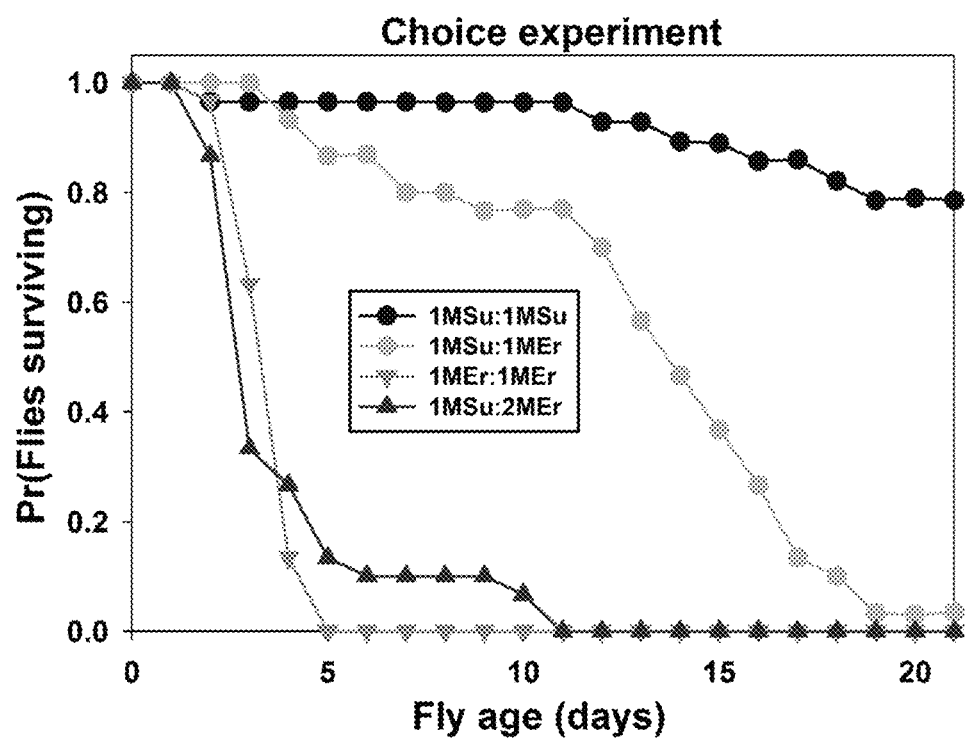
FIG. 5 is a graph illustrating the finding that *Drosophila melanogaster* ingest erythritol as often as they ingest sucrose in a two-way choice experiment. The graph illustrates percentage of living adult flies when given a choice between two different food sources throughout their lifespan. Negative control choice experiments provide 1M sucrose on both sides of choice chamber. Positive control choice experiments provide 1M erythritol on both sides of the choice chamber. Experimental groups provide 1M erythritol on one side of the choice chamber and 1M sucrose on the opposite side of the chamber; and 2M erythritol on one side of the choice chamber and 1M sucrose on the opposite side of the chamber. There was significant decrease in longevity in both experiments where erythritol is provided as a choice with sucrose. 120 total flies were used for these experiments.

To determine if erythritol containing food was in some way repulsive to flies, two-way choice experiments were performed. Flies were provided with free access to two food sources: 1M sucrose control food, 1M erythritol, and 2M erythritol, and their longevity over time monitored. Blue dye in one food per choice trial was used to ensure that food was being taken up by the flies (see Methods). Flies with a choice between 1M sucrose and 1M erythritol had significantly decreased longevity relative to sucrose: sucrose choice ($X^2=37.5$, $p<0.001$; FIG. 5). Longevity was also significantly reduced when we provided the flies with a choice between 1M sucrose and 2M erythritol ($X^2=60.5$, $p<0.001$; FIG. 5).

Taken together, the data show that flies consumed foods containing erythritol when given access to sucrose-containing (control) food. Though amounts of food consumed by flies in the studies was not quantified, one pattern in the food choice data suggests flies found erythritol-containing food equally attractive to sucrose (control) food: the survival distributions were nearly identical between our 2M erythritol/1M sucrose choice treatment and our 1M erythritol/1M erythritol treatment ($X^2<0.00$, $p=0.996$; FIG. 5). This pattern is consistent with expectations if flies consumed sucrose and 2M erythritol foods in roughly equal amounts, effectively diluting the erythritol concentration by half (to 1M erythritol). In any case, the choice experiments showed flies will consume food with erythritol when given access to other food sources and suffer increased mortality as a result. Thus, erythritol baits can function as an effective insecticide delivery mechanism when presented in naturalistic situations where insects have access to other foods.

Example 6: Comparison of Erythritol with Other Human-Safe Sweet Alcohols

An experiment was conducted to compare the effectiveness of erythritol with other human-safe sweet alcohols: D-mannitol, maltitol, sucrose, and xylitol. The concentration of all sweet alcohols were 1M.

Flies were raised for 17 days on standard fly food that contained 1 M concentrations of each sweetener treatment. Death of flies was recorded daily as before; each treatment was replicated on three vials of 10 flies each for 30 subjects/treatment. Differences in longevity were analyzed using the Kaplan-Meier survival analysis log rank test, making all pairwise comparisons among treatments.

Fly longevity in the erythritol treatment (mean 4.7±0.15 SE days) was significantly lower than fly longevity for all other treatments (means 14.3-16.3 days, all $X^2>52.5$, all $p<0.001$). Compared to sucrose (positive control), D-mannitol fed flies had slightly but significantly reduced longevity ($p=0.004$); other sweeteners did not differ from the control (maltitol $p=0.86$, xylitol $p=0.96$).

These data confirm the insecticidal activity of erythritol. The data further indicate that D-mannitol has almost insignificant insecticidal effect, and xylitol and maltitol were not effective at reducing fly longevity across 17 days of exposure. Thus, erythritol, but not the other sweeteners tested herein, is toxic to fruit flies upon ingestion.

As illustrated in FIG. 6, erythritol-fed flies had significantly shorter longevity than flies fed several other non-nutritive alcohols. Also, the longevity of flies fed several other non-nutritive alcohols did not differ from sugar control.

Example 7: Termite Collection

Termites used in the survival and choice experiments were collected from three field colonies in Scotland Run Park (39.66° N, 75.05° W) in Clayton, NJ between April and May 2019. After collection, colonies were maintained in plastic containers with soil and wood from the collection site as a substrate in laboratory conditions (20.8±0.9° C., 49±7% RH). Termites used in the consumption experiment were collected from a single field colony at Cobb's Creek Park (39.94° N, 75.24° W) in Philadelphia, PA during September of 2018. Workers were removed from the log and housed within 24 h of collection in 9 cm diameter petri dishes containing damp paper towel as a food source. Dishes were placed in an incubator at 26° C. (relative humidity varied between 40 and 60% across trials, but was consistent among all treatments within each trial). Each petri dish contained 10 workers. Termites used in all experiments measured 3-4 mm in length.

Example 8: Paper Bait Preparation

For the survival experiment, unbleached, brown paper towels (12 cm×24 cm, cat no. 01801, Kimberly-Clark Corporation, Neenah, WI), were completely submerged for 15 s in solution of distilled water, erythritol (100% purity, NOW foods, Bloomingdale, IL) of the below-specified concentrations, and 0.05% Brilliant Blue R-250 dye (cat. no 27816, Sigma-Aldrich, St. Louis, MO). The erythritol concentrations used were: 0 M (control), 0.25 M, 0.5 M, 0.75 M, 1.0 M, and 1.25 M. The treated paper towels were removed from solution and allowed to dry horizontally on racks before being cut into squares with an area of 144 $cm^2$. Papers were thereafter stored dry at room temperature in sealed containers.

For the consumption trial and choice assays, white filter papers were used instead of brown paper towels, which allowed for more obvious detection of blue dye in the gut during consumption trials and also retained moisture better during the choice assay. Filter papers (15 cm diameter, filter paper 413, cat no. 28310-128, VWR, Radnor, PA) were submerged in solution of distilled water, erythritol (100% purity, NOW foods, Bloomingdale, IL) in the below-specified concentrations, and 0.05% Brilliant Blue R-250 dye (cat. no 27816, Sigma-Aldrich, St. Louis, MO) for 15 s. The erythritol concentrations used were as follows: 0 M (control), 0.25 M, 0.5 M, 0.75 M, 1.0 M, and 1.5 M. The treated filter papers were allowed to dry horizontally on racks in an oven at 60° C., before being cut to a final area of 44.2 $cm^2$ (circles cut into quarters), and thereafter stored dry at room temperature in sealed containers. For choice trials, treated filter papers were cut into 2 cm diameter disks.

Example: 9 Concentration-Dependent Effects of Erythritol on Termite Longevity

Prior to the beginning of the experiment, termites were allowed to acclimate for 3 d to the petri dishes, in order to control for any death due to injury incurred during movement to the petri dishes; this was called the pretrial period. At the beginning of the pretrial period, termites used in the survival experiment were transferred from sections of natural nest kept in laboratory rearing boxes to 9 cm diameter plastic petri dishes lined with brown, unbleached paper towel (12 cm×24 cm) not treated with erythritol. The paper towel was rehydrated with 1 ml of distilled water. Each dish contained 10 workers. After the third (final) day of the pretrial period, dishes were checked for dead termites, assumed to be dead due to injury, and dead termites were replaced with live individuals from a petri dish of extra termites kept in similar conditions.

Following the pretrial period, the experiment was set up: pretrial paper towels were removed and replaced with treated paper towels of the correct erythritol treatment concentration; these were rehydrated with 750 µL of distilled water. Six treatment groups (0 M, 0.25 M, 0.5 M, 0.75 M, 1.0 M, 1.25 M erythritol) were used per colony (n=3 colonies), with three dishes per treatment, each containing 10 termite workers (n=30 workers/treatment/colony, n=540 total workers). Termite mortality was recorded every 24 h for 8 d.

Example 10: Assessing Erythritol Consumption Using Blue Dye

To confirm that termites consumed erythritol-treated filter paper, papers were stained with blue dye, which was visible through the exoskeleton of the worker's abdomens after consumption For this experiment, a pretrial period of 1 d was used to allow termites to acclimate to experiment conditions. Termites that had previously been placed in petri dishes directly after final collection were checked for survival at the end of the 24-h pretrial period. Dead individuals were removed and replaced with live individuals. Dishes were then assigned to treatment groups and paper towels were replaced with blue-stained, erythritol-treated filter papers, which were rehydrated with 750 µL distilled water. White filter papers were used in this experiment instead of unbleached paper towels because the brown color of the unbleached towels interfered with our ability to assess the presence of blue dye in the gut. Six treatment groups (0 M, 0.25 M 0.5 M, 0.75 M, 1.0 M 1.5 M erythritol), with three dishes per treatment, each containing 10 termite workers (n=30 workers/treatment, n=180 total workers) were assessed for the presence of blue dye, visible through the exoskeleton, in the gut of dead individuals every 24 h for 8 d. Treated paper towels were replaced, and new paper towels rehydrated with water, every 4 d. Replacement was necessary to maintain adequately sanitary conditions inside the petri dishes.

Example 11: Choice Test

Choice arenas were constructed from 9 cm diameter plastic petri dishes containing two, 2 cm diameter filter paper disks placed 2 cm apart in the center of the arena, rehydrated with 50 µL distilled water each. During each trial, termites were exposed to either paired control-control disks (two, 0 M erythritol disks), treatment-treatment disks (two, 1.25 M erythritol disks), or control-treatment disks (one each 0 M and 1.25 M erythritol disks). Fifty termites were placed in each choice arena, and choice arenas were placed in a closed cardboard box to minimize light disturbance. Three replicates, each using a different colony (n=50 workers/colony/treatment for a total of 150 termites per treatment), were performed for each choice combination (total n=450). Termite attendance at either filter paper disk was recorded by photographing the dishes. Recording began 5 min after termites were placed in dishes with disks, and every 5 min thereafter for 1 h, totaling 12 observations. Termites not attending either disk were not counted. No termites died during the choice trials.

Example 12: Statistical Analyses

Analyses were performed using SPSS v. 24 (IBM corp. 2016) and Sigmaplot v.12.5 (Systat Software 2013) software. Differences in survival distributions across concentrations for all colonies, within the colonies, and across colonies were tested using pairwise log-rank Mantel Cox tests in SPSS, with subjects living to the end of the trial or lost to reasons other than death (e.g., escaped or injured) included in the analysis as right-censored values. Mean percent mortality was calculated for each concentration across colonies at 72 and 96 h and a three parameter, best-fit sigmoid curve was fitted to the data in Sigmaplot to assess LC at these time points.

Relative forager preference at each time point was determined (as in El-Keredy et al. 2012) as:

$$PREF(ert) = \frac{\text{\# termites on erythritol paper} - \text{\# termites on control paper}}{\text{total \# of termites foraging at that time point}}$$

The relative preference values from the 12 time points were then averaged, to get an overall relative forager preference over the course of the trial. This method constrains the preference values between 1 and −1, with positive values indicating a preference for erythritol and negative values indicative of avoidance. Differences in relative forager preference between 1.25 M/0 M, 0 M/0 M, and 1.25 M/1.25 M trials were assessed using a Kruskal-Wallis test. Differences between the relative preference within each trial and a random chance relative preference (i.e., 50% of foraging termites on each filter paper disk on average over the trial) were tested using one sample t-tests (with a value of 0 relative preference in the one sample t-test representing random chance; El-Keredy et al. 2012).

Example 13: Concentration-Dependent Mortality

Figure 9:
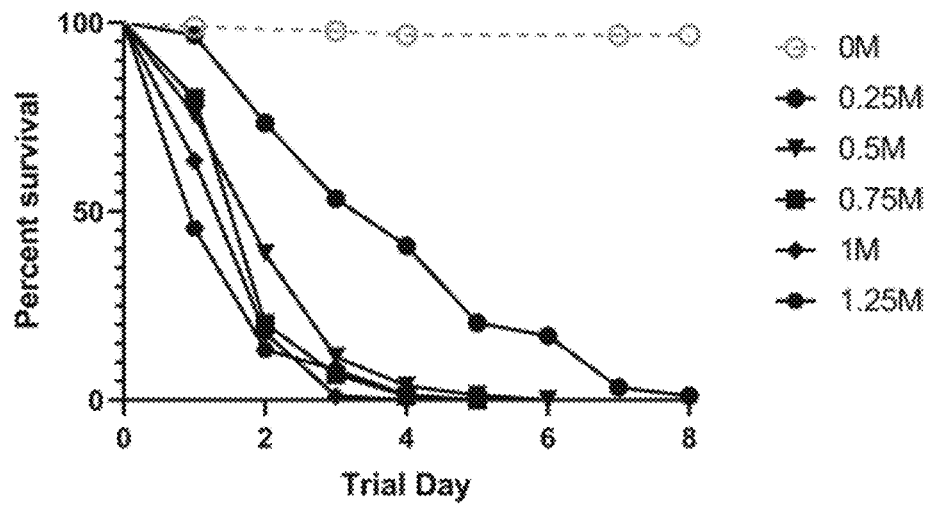
FIG. 9 is a graph illustrating that erythritol ingestion causes concentration-dependent mortality in *R. flavipes* workers. Survival plot showing percent survival of worker *R. flavipes* (n=90 workers/concentration) over time. Individual lines represent treatment groups receiving filter paper treated with increasing concentrations of erythritol (0-1.25 M). All treatments are significantly different from 0 M.

Longevity of R. flavipes workers to 8 d differed significantly between 0M control and all erythritol concentration treatments (FIG. 9 Mantel-Cox, 0.25M: $X^2=179.93$, $P<0.001$; 0.5 M: $X^2=184.64$, $P<0.001$; 0.75 M: $X^2=189.60$, $P<0.001$; 1 M: $X^2=188.34$, $P<0.001$; 1.25 M: $X^2=189.90$, $P<0.001$). Longevity was also concentration-dependent (FIG. 9). Concentration dependence lessened at higher concentrations: there was only a moderately significant difference between 0.75 M and 1.0 M treatments ($X^2=4.86$, $P=0.027$), and no significant difference between 0.5 M and 0.75 M ($X^2=2.84$, $P=0.09$) or between 1.0M and 1.25 M treatments ($X^2=1.04$, $P=0.31$). The magnitude of the decrease in mean termite longevity differed between subsequent increases in treatment concentration (FIG. 10). The decrease in mean longevity was greatest as concentration increased from 0 M to 0.25 M (FIG. 10; reduction in mean longevity of 3.77 d) and 0.25 M to 0.5 M (reduction in mean longevity of 1.74 d). Reduction in mean longevity was smaller between higher subsequent concentrations (FIG. 10; 0.5-0.75 M: reduction of 0.23 d; 0.75-1.0 M: reduction of 0.26 d; 1.0-1.25 M: reduction of 0.14 d).

Example 14: $LC_{50}$ Estimates

The best-fit sigmoidal curve for 24 h $LC_{50}$ data was:
Percent (mortality at 24 h)=$109.26/^{A}1+e^{(-([Erythritol]-0.1.26)/0.40)^{a}}$. This curve was a significantly good fit to the data ($R^2=0.92$, $P=0.0207$) and using the equation we estimated the $LC_{50}$ be 1.19 M erythritol.

The best-fit sigmoidal curve for 48 h $LC_{50}$ data was:
Percent (mortality at 48 h)=$84.56/^{A}1+e^{(-[Erythritol]-0.37)/0.12)^{a}}$. This curve was a significantly good fit to the data (FIG. 11: R2=0.996, P 0.0003) and using the equation we estimated the $LC_{50}$ at 48 h to be 0.42 M erythritol.

Example 15: Intercolony Variation in Erythritol Effects on Longevity

Colonies differed in their response to erythritol (FIG. 12: Mantel-Cox, 0M: $X^2=0$, $P=1.00$; 0.25M: $X^2=42.79$, $P<0.001$; 0.5M: $X^2=17.55$, $P<0.001$; 0.75M: $X^2=9.05$, $P=0.011$; 1M: $X^2=22.89$, $P<0.001$; 1.25M: $X^2=14.80$, $P=0.001$). This difference was exhibited as early as day 1, indicating erythritol was more immediately toxic to some colonies (Mantel-Cox, 0M: $X^2=2.00$, P 0.37; 0.25M: $X^2=6.14$, $P=0.046$; 0.5M: $X^2=12.97$, $P=0.002$; 0.75M: $X^2=11.54$, $P=0.003$; 1M: $X^2=26.40$. $P<0.001$; 1.25M: $X^2=29.33$, $P\leq0.001$).

Example 16: Confirmation of Consumption of Treated Filter Papers

Of the treatment termites that died in the consumption test, 81% had blue dye visible in their guts through the exoskeleton, confirming that they had ingested erythritol-treated filter papers.

Example 17: No Avoidance of Erythritol at 1.25 M

Termites did not differ in their relative preference for 1.25 M erythritol versus 0 M erythritol-treated filter paper disks when compared with preferences in either the 0 M/0 M or 1.25M/1.25M tests (Kruskal-Wallis, KW=0.08, P=0.99). None of the three tests differed in their relative preference from random chance (one sample t-test, 0 M/1.25 M, t=0.42, P=0.72; 0 M/0 M, t=0.33, P=0.77; 1.25 M/1.25 M, t=0.36, P=0.75).

Example 18: Termites

Erythritol is toxic to multiple insect taxa when ingested, including fruit flies, mosquitoes, and ants. In this experiment, it was found that erythritol consumption also reduced R. flavipes worker longevity in a concentration-dependent manner, with significant effects on longevity starting at 0.25 M erythritol. While longevity decreased with increasing concentration, the magnitude of the mean reduction in longevity was not consistent between consecutive increases in concentration; the reduction in mean longevity was greater between increases at lower concentrations (e.g., 0-0.25 M; 0.25-0.5 M), compared to the reduction in mean longevity at higher concentrations (e.g., 0.5-0.75 M and above). These results indicate that while survival and longevity are indeed concentration dependent, and mean longevity is lowest at the highest treatment concentrations, increases in concentration above 0.5 M do not yield proportionally greater increases in efficacy.

In longevity experiment significant intercolony differences in susceptibility to the effects of erythritol was found. Susceptibility to other insecticides can vary substantially between termite colonies. The variation in susceptibility to erythritol may indicate a genetic component to erythritol's mechanism of lethality, or it could indicate colony differences in environmental experience prior to testing. Despite these intercolony differences, workers from all tested colonies were susceptible to relatively low concentrations of erythritol, and intercolony variation did not substantially decrease erythritol efficacy. The mechanism of erythritol's lethality may be linked to osmotic balance. In mosquitoes exposed to erythritol, mortality is partially rescued with access to extra water, and erythritol changes osmotic pressure in the fly hemolymph. Further, polyol ingestion induces hyper-regurgitation in flies, which may be a response to osmotic shock. The rate of termite mortality found in our study was high compared to previous experiments using fruit flies. In previous work, 50% mortality was achieved in fruit flies after 20 d of exposure to 0.5 M erythritol food. In our study, termites reached 50% mortality within 2 d of exposure to 0.5 M erythritol filter papers.

Considering termite intolerance of desiccation, this comparatively increased rate of mortality supports the notion that water balance disruption could be part of the mechanism causing increased mortality in termites.

It was confirmed that erythritol was consumed by termites at all treatment concentrations, as indicated by the presence of blue dye visible through the exoskeleton of 81% of dead termites. The mortality observed in termites with no blue visible in the gut may be attributed to injury or stress during the removal of termites from the nest and transfer into petri dishes.

Though consumption indicated that termites do not reject erythritol, a choice assay was necessary to determine whether termites would avoid erythritol-treated food if offered an alternative (i.e., untreated paper). No difference in termite attendance of 1.25 M erythritol or control disks were found when termites were given a choice. While the choice assay did not measure consumption, absence of individuals at a food source can serve as an indication of avoidance. Thus, the equal attendance of termites at control and erythritol-treated filter paper disks suggests they do not avoid erythritol, even at very high concentrations. However, it is unknown whether termites are able to detect erythritol. Random attendance at filter paper disks may be due to lack of preference for control foods compared to erythritol-treated foods; this could indicate that termites are unable to sense erythritol. Fire ants cannot detect erythritol in foods. Feeding choice assays performed on *R. flavipes* (formerly *R. santonensis*) found that erythritol did not stimulate feeding behavior. However, thin-layer chromatography analysis showed that erythritol occupies the same biologically active, phagostimulatory zone as termite labial gland secretions, indicating that erythritol and the secretions likely have similar physicochemical properties, and thus may be detected by termites. Even if termites can detect erythritol, the choice assay suggests that termites do not display preference or avoidance of the compound in the presence of alternative food sources.

The experiments presented herein demonstrated that erythritol is effective at reducing termite longevity in a concentration-dependent manner, and that termites do not display avoidance to erythritol, supporting its potential to be used as an ingestible insecticide. Insecticides for social insects that rely on ingestion by workers must be nonrepellant and slow-acting, in order to be effectively transferred through the colony.

Example 19: Example Formulations of Erythritol for Use in the Methods Described Herein

TABLE 1

| | | |
|---|---|---|
| Formula 1: Soluble concentrate formulation | | |
| Erythritol sugar solution | | 0.1M-2.0M |
| coconut diethanolamide | surfactant | 25 g/l |
| aqueous solution of monosodium salt of Alkylamine Dicarboxylates | thickener/adjuvant surfactant/ | 10 g/l |
| sodium Gluconate | thickener/surfactant/adjuvant | 10 g/l |
| trisodium citrate | thickener/surfactant/adjuvant | 10 g/l |

TABLE 1-continued

| | | |
|---|---|---|
| sodium chloride | thickener/surfactant/adjuvant | 2 g/l |
| sodium benzoate | preservative | 20 g/l |
| water | carrier | to 1 liter |
| Formula 2 Ready-to-use miticide spray | | |
| Erythritol sugar solution | | 0.1M-2.0M |
| t-octylphenoxypolyethoxyethanol, polyoxyethylenesorbitan, organosilicate | Emulsifier | 1 |
| ethyl alcohol/isopropyl alcohol | Solvent | 5 |
| Tannic acid | | 1 |
| water | Carrier | 92.9 |
| Formula 3 Concentrated natural emulsifiable concentrate spray | | |
| Erythritol sugar solution | | 0.1M-2.0M |
| Pyrethrins | | 7 |
| t-octylphenoxypolyethoxyethanol, polyoxyethylenesorbitan, organosilicate | Emulsifier | 15 |
| e.g. ethyl alcohol/isopropyl alcohol | Solvent | 70 |
| Formula 4 Concentrated emulsifiable concentrate spray | | |
| Erythritol sugar solution | | 0.1M-2.0M |
| Platyphyllol (natural or synthetic) | | 22 |
| t-octylphenoxypolyethoxyethanol/polyoxyethylenesorbitan/organosilicate | Emulsifier | 34 |
| ethyl alcohol/isopropyl alcohol | Solvent | 22 |
| Formula 5 Natural ready to use insecticide spray | | |
| Erythritol sugar solution | | 0.1M-2.0M |
| Lavender oil/Garlic oil/Clove oil/citrus oils | | 1 |
| t-octylphenoxypolyethoxyethanol, polyoxyethylenesorbitan, organosilicate | Emulsifier | 1 |
| Solvent e.g. ethyl alcohol, isopropyl alcohol etc | | 40 |
| Water | Carrier | 57 |
| Formula 6 Oil-based natural spray concentrate | | |
| Erythritol sugar solution | | 0.1M-2.0M |
| Petroleum oil | | 90 |
| t-octylphenoxypolyethoxyethanol, polyoxyethylenesorbitan, organosilicate | Emulsifier | 1 |
| Formula 7 Concentrated emulsifiable concentrate spray | | |
| Erythritol sugar solution | | 0.1M-2.0M |
| Permethin | | 10 |
| Piperonyl butoxide | | 28 |
| Emulsifier: e.g. t-octylphenoxypolyethoxyethanol. polyoxyethylenes orbitan, organosilicate | Emulsifier | 31 |
| Solvent e.g. ethyl alcohol, isopropyl alcohol etc | | 21 |
| Formula 8 Molluscidal dust | | |
| Erythritol sugar solution | | 0.1M-2.0M |
| Anti-caking agent (e.g. silica gel) | | 2 |
| Emulsifier: e.g. t-octylphenoxypolyethoxyethanol, polyoxyethylenesorbitan, organosilicate | Emulsifier | 3 |
| Inert carrier (talc, kaolin, diatomaceous earth) | | 93 |
| Formula 9 Aerosol insecticidal and acaricidal | | |

TABLE 1-continued spray

| | | |
|---|---|---|
| Erythritol sugar solution | | 0.1M-2.0M |
| Piperonyl butoxide | | 0.9 |
| Propellent hydrocarbon | | 98.1 |

Formula 10 Repellent

| | | |
|---|---|---|
| Erythritol sugar solution | | 0.1M-2.0M |
| Citronella oil | | 29.1 |
| Phthalic acid dibutyl ester | | 29.1 |
| N-octyl bicycloheptene dicarboxamide | | 22.3 |

Formula 11 Ready-to-use miticide spray - II

| | | |
|---|---|---|
| Erythritol sugar solution | | 0.1M-2.0M |
| t-octylphenoxypolyethoxyethanol, polyoxyethylenesorbitan, organosilicate | Emulsifier | 1 |
| Solvent: e.g. ethyl alcohol, isopropyl alcohol etc | | 5 |
| Tannic acid | | 1 |
| water | Carrier | 92.8 |

Formula 12 EC formulation

| | | |
|---|---|---|
| Erythritol sugar solution | | 0.1M-2.0M |
| Geronol FF/4-E | Emulsifier (blended) | 31 |
| Geronol FF/6-E | Emulsifier (blended) | 20 |
| 3,5-Di-tert-butyl-4-hydroxytoluol | Stabilizer | 20 |
| Moussex 998 HL | Antifoaming agent | 20 |
| N-Methylpyrrolidon | Solvent | 900 |

Formula 13 SG formulation

| | | |
|---|---|---|
| Erythritol sugar solution | | 0.1M-2.0M |
| Lactose | | 24% |
| Benzenesulfonic acid, MonoC10-13-Alkyl Derivs, Sodium salt | | 50% |
| Resole 12111 A blue dye | | 0% |
| BN200 L | | 5% |
| Agrilan 789 | | 1% |
| Water | | 6% |

Formula 14 EC formulation

| | | |
|---|---|---|
| Erythritol sugar solution | | 0.1M-2.0M |
| Emulsifier Teva-8905-C | Emulsifier | 70 |
| Anti-foaming agent S-10 (Main component: Poly(dimethylsiloxane) | Anti-foaming agent | 0.5 |
| Aromatic petroleum solvent 5150 | Solvent | up to 1 ltr |

Formula 15 EC formulation

| | | |
|---|---|---|
| Erythritol sugar solution | | 0.1M-2.0M |
| Tensiofix B 7438 | | 30 |
| Tensiofix B 7453 | | 30 |
| Shellsol A | | 740 |
| Total | | 900 |

Formula 16 WDG formulation

| | | |
|---|---|---|
| Erythritol sugar solution | | 0.1M-2.0M |
| Corn syrup solids | Carrier | 30 |
| Polyfon H or F, Lignosulfonic acid, sodium salt | Dispersant | 20 |

Formula 17 Soluble Powder

| | | |
|---|---|---|
| Erythritol sugar solution | | 0.1M-2.0M |
| Sodium lauryl sulphate | Anionic surfactant | 5 |
| Mixture of Dioctyl sodium sulfosuccinate and Sodium benzoate | Dispersant | 10 |

Formula 18 EC formulation

| | | |
|---|---|---|
| Erythritol sugar solution | | 0.1M-2.0M |
| Toximul SEE 341 | Emulsifier (Blend) | 21 |
| Bio-Soft N411 | Emulsifier (Blend) | 50 |
| Stepsol C-25 | Solvent | up to 1 L |

Formula 19 EC formulation

| | | |
|---|---|---|
| Erythritol sugar solution | | 0.1M-2.0M |
| C 9 Petroleum Distillate | Solvent | 485 g/l |
| Mixture of calcium alkyl benzene sulfonate and Polyoxy ethylene ether | Emulsifier | 20 20 |
| Mixture of calcium alkyl benzene sulfonate and Polyoxy ethylene ether | Emulsifier | 30 30 |

Formula 20 SC formulation

| | | |
|---|---|---|
| Erythritol sugar solution | | 0.1M-2.0M |
| glycerol | bacteriostatic | 55 |
| water | solvent | to 1 liter |
| organic impurities | UV-protection | 35% w/w |

Formula 21 EC formulation

| | | |
|---|---|---|
| Erythritol sugar solution | | 0.1M-2.0M |
| Polyoxyethylene styrylphenyl ether (non-ionic surfactant) Calcium dodecylbenzene sulfonate (anionic surfactant) Aromatic hydrocarbon (aromatic solvent) | Emulsifier | 40 7 |
| Hydrocarbons, C10, aromatics, <1% naphthalene | Solvent | 560 |
| Hydrocarbons, C10, aromatics, <1% naphthalene | Solvent | |

Formula 22 SC formulation

| | | |
|---|---|---|
| Erythritol sugar solution | | 0.1M-2.0M |
| 1,2-proppylene Glycol | | 80 |
| Polyfon H | | 15 |
| Symperonic PE/P 75 | | 15 |
| Proxel XL 2 | | 3 |
| Kelzan | | 2.5 |
| Antifoam 1520 | | 0.5 |
| Water | | 500 |

Formula 23 WG

| | | |
|---|---|---|
| Erythritol sugar solution | | 0.1M-2.0M |
| Supragil WP | Anionic wetting agent | 20 |
| Vanisperse CB | Dispersing agent | 60 |
| Supragil MNS/90 | Dispersing agent | 40 |
| Moussex 3032 HPF | Antifoaming agent | 10 |
| Chinafill BSK-H | Inert and a.i. balance | 25 |

Formula 24 WG formulation

| | | |
|---|---|---|
| Erythritol sugar solution | | 0.1M-2.0M |
| Wetter sodium dodecylsulfate | | 20 g/kg |
| Dispersant naphthalenesulfonic acid formaldehyde | | 40 g/kg |
| Surfactant sodium lignosulfonate | | 40 g/kg |
| Adjuvant thiamine | | 100 g/kg |
| white clay (kaolin) white clay (kaolin) | | 100 g/kg |

TABLE 1-continued

Formula 25 EC formulation

| | | |
|---|---|---|
| Erythritol sugar solution | | 0.1M-2.0M |
| Surfactant tween-80 (Polyoxyethylene (20) sorbitan monooleate) | Emulsifier | 60 |
| Sodium dodecyl benzene sulfonate | Surfactant | 60 |
| Shellsol A100 | Solvent | Up to 1 ltr |

Example 44 Soluble Liquid formulation

| | | |
|---|---|---|
| Erythritol sugar solution | | 0.1M-2.0M |
| Isopropanol | Solvent | Up to 1 lt |

Formula 26 Wettable Granule formulation

| | | |
|---|---|---|
| Erythritol sugar solution | | 0.1M-2.0M |
| Polyfon H Westvaco sodium lignosulfonate | | 50 g/kg |
| Aerosol OT-B Cyanamid sodium dioctylsulfosuccinate | | 25 g/kg |
| Vynamon Blue SA-FW (501510) ICI organics -> Avecia ->HeubachBlue pigment 15.1 (colour index 74160) | | 5 g/kg |
| sodium acetate, anhydrous Hoechst sodium acetate, anhydrous | | 100 g/kg |
| Crex Brunner Mond Group plc sodium sesquicarbonate | | to 1 k |

Formula 27 SC formulation

| | | |
|---|---|---|
| Erythritol sugar solution | | 0.1M-2.0M |
| Emulson AG BRN 85 | Surfactant (Blend) | 60 |
| Antifoam GEN | Antifoam | 1 |
| Madeol X80 | Thickener | 2 |
| Citric Acid | pH-adjuster | 1.5 |
| Proxel GXL | Bactericide | 1 |
| Glycerin (99.5%) | Anti-Freeze | 15 |
| Water | Solvent | Up to 1 L |

Formula 28 Soluble concentrate formulation (2 way with Maltodextrin)

| | | |
|---|---|---|
| Maltodextrin | | 0.1M-2.0M |
| Erythritol | surfactant | 25 g/l |
| aqueous solution of monosodium salt of Alkylamine dicarboxylate | thickener/surfactant/adjuvant | 10 g/l |
| sodium Gluconate | thickener/surfactant/adjuvant | 10 g/l |
| trisodium citrate | thickener/surfactant/adjuvant | 10 g/l |
| sodium chloride | thickener/surfactant/adjuvant | 2 g/l |
| sodium benzoate | preservative | 20 g/l |
| water | carrier | to 1 liter |

Formula 29 Gel formulation

| | | |
|---|---|---|
| Erythritol | surfactant | 25 g/l |
| surfactant | | 5.2 g/L |
| xanthan gum | | 1.04 g/L |
| defoamer | | 0.2 g/l |
| propylene glycol | | 154.4 g/l |
| Water | | Up to 100% |

Each of the additive agents or erythritol in Formulas 1-29 can be present in the composition in an amount of about 0.005% to about 95% (w/w) or (w/v), or (v/v). In certain embodiments, each additive component or erythritol in Formulas 1-29 is independently present in an amount of about 0.005%, 0.01%, 0.015%, 0.02%, 0.025%, 0.03%, 0.035%, 0.04%, 0.045%, 0.05%, 0.055%, 0.06%, 0.065%, 0.07%, 0.075%, 0.08%, 0.085%, 0.09%, 0.095%. 0.1, 0.5, 1%, 1.5, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, 41.0%, 41.5%, 42.0%, 42.5%, 43.0%, 43.5%, 44.0%, 44.5%, 45.0%, 45.5%, 46.0%, 46.5%, 47.0%, 47.5%, 48.0%, 48.5%, 49.0%, 49.5%, 50.0%, 50.5%, 51.0%, 51.5%, 52.0%, 52.5%, 53.0%, 53.5%, 54.0%, 54.5%, 55.0%, 55.5%, 56.0%, 56.5%, 57.0%, 57.5%, 58.0%, 58.5%, 59.0%, 59.5%, 60.0%, 60.5%, 61.0%, 61.5%, 62.0%, 62.5%, 63.0%, 63.5%, 64.0%, 64.5%, 65.0%, 65.5%, 66.0%, 66.5%, 67.0%, 67.5%, 68.0%, 68.5%, 69.0%, 69.5%, 70.0%, 70.5%, 71.0%, 71.5%, 72.0%, 72.5%, 73.0%, 73.5%, 74.0%, 74.5%, 75.0%, 75.5%, 76.0%, 76.5%, 77.0%, 77.5%, 78.0%, 78.5%, 79.0%, 79.5%, 80.0%, 80.5%, 81.0%, 81.5%, 82.0%, 82.5%, 83.0%, 83.5%, 84.0%, 84.5%, 85.0%, 85.5%, 86.0%, 86.5%, 87.0%, 87.5%, 88.0%, 88.5%, 89.0%, 89.5%, 90.0%, 90.5%, 91.0%, 91.5%, 92.0%, 92.5%, 93.0%, 93.5%, 94.0%, 94.5%, or about 95% (w/w) or (w/v), or (v/v).

Formula 30—Bait Formulation:

An insect bait composition, comprising an insecticide of 10 to 50% Erythritol and attractant food baits that can comprise of a single or multiple mixture of 50 to 90% from onions, sucrose, sugar, cane sugar, milk, milk powder, wheat flour, flour, cucumber, eggs, potatoes, honey mixed with fruits such as oranges, apples, grapefruit, blueberries, plums, pineapple, watermelon, grapes, mangos, mandarins are mixed to form a dry composition and 25-35 wt % of water is added to the dry composition to form a paste or putty Enumerated Embodiments The following enumerated embodiments are provided, the numbering of which is not to be construed as designating levels of importance Embodiment 1 provides a composition comprising:
  1-50% w/w erythritol;
  1-50% w/w feeding stimulant; and
  at least one additional component selected from the group consisting of water, an odorant, a nitrogen source, a sodium salt, a thickener, an attractant, a defoamer, a dispersing agent, a feeding stimulant, a flavoring agent, a surfactant, a preservative, a gel-forming component, a suspending agent, and an oil.

Embodiment 2 provides the composition of embodiment 1, wherein the feeding stimulant is a sugar.

Embodiment 3 provides the composition of any one of embodiments 1-2, wherein the composition further comprises water, and 1-99% w/w each of a surfactant, at least one thickener, and at least one preservative.

Embodiment 4 provides the composition of any one of embodiments 1-3, wherein the at least one thickener is selected from the group consisting of monosodium alkylamine dicarboxylate, sodium gluconate, trisodium citrate, and sodium chloride, wherein the alkylamine dicarboxylate comprises a $C_{1-24}$ alkyl amine.

Embodiment 5 provides the composition of any one of embodiments 1-4, wherein the composition is a solid composition, liquid compositions, or a gel composition.

Embodiment 6 provides the composition of any one of embodiments 1-5, wherein the surfactant is coconut diethanolamide.

Embodiment 7 provides the composition of any one of embodiments 1-6, wherein the composition comprises:
- 1-50% w/w erythritol;
- 1-50% w/w sucrose;
- 1-50% w/w coconut diethanolamide;
- 1-50% w/w each of at least one of alkyl amine dicarboxylate, sodium gluconate, trisodium citrate, or sodium chloride;
- 1-50% w/w sodium benzoate; and water.

Embodiment 8 provides an insect bait, comprising:
the composition of any one of embodiments 1-7, and
a substrate that comprises the composition.

Embodiment 9 provides the bait of embodiment 8, wherein the substrate comprises cellulose.

Embodiment 10 provides the bait of any one of embodiments 8-9, wherein the attractant comprises a sugar and a sodium salt.

Embodiment 11 provides the bait of any one of embodiments 8-10, wherein the cellulose is paper.

Embodiment 12 provides the bait of any one of embodiments 8-11, wherein the composition is absorbed in the cellulose.

Embodiment 13 provides the bait of any one of embodiments 8-12, wherein the bait is an insect bait station.

Embodiment 14 provides the bait of any one of embodiments 8-13, wherein the composition is a solid composition, liquid compositions, or a gel composition.

Embodiment 15 provides a method for killing an insect or impairing an insect's ability to function, the method comprising:
contacting the insect with the composition of any one of claims 1-7,
wherein the composition is not substantially toxic when administered to a mammal; and
wherein the insect is a termite selected from the group consisting of *Reticulitermes flavipes, Reticulitermes virginicus, Reticulitermes hageni, Coptotermes formosanus, Amitermes floridensis, Incitermes minor, Neothermes connexus, R. hesperus, R tibialis, Heterotermes aureus, Reticulitermes* sp., *Heterotermes* sp., and *Termitidae* sp.

Embodiment 16 provides method for killing an insect or impairing an insect's ability to function, the method comprising:
contacting the insect with the composition of any one of claims 1-7,
wherein the composition is not substantially toxic when administered to a mammal; and
wherein the insect is a leaf cutter ant selected from the genera *Atta* and *Acromyrmex*.

Embodiment 17 provides the method of embodiment 17, wherein the leaf cutter ant is a species selected from the group consisting of *Acromyrmex ambiguus, Acromyrmex ameliae, Acromyrmex aspersus, Acromyrmex balzani, Acromyrmex biscutatus, Acromyrmex coronatus, Acromyrmex crassispinus, Acromyrmex diasi, Acromyrmex disciger, Acromyrmex echinatior, Acromyrmex evenkul, Acromyrmex fowleri, Acromyrmexfracticornis, Acromyrmex heyeri, Acromyrmex hispidus, Acromyrmex hystrix, Acromyrmex insinuator, Acromyrmex landolti, Acromyrmex laticeps, Acromyrmex lobicornis, Acromyrmex lundii, Acromyrmex niger, Acromyrmex nigrosetosus, Acromyrmex nobilis, Acromyrmex octospinosus, Acromyrmex pubescens, Acromyrmex pulvereus, Acromyrmex rugosus, Acromyrmex silvestrii, Acromyrmex striatus, Acromyrmex subterraneus, Acromyrmex versicolor, Acromyrmex volcanus, Atta bisphaerica, Atta capiguara, Atta cephalotes, Atta colombica, Atta cubana, Atta goiana, Atta insularis, Atta laevigata, Atta mexicana, Atta opaciceps, Atta pilosa, Atta robusta, Atta saltensis, Atta sexdens, Atta tardigrada, Atta texana, Atta vollenweideri*.

Embodiment 18 provides a method for killing an insect or impairing an insect's ability to function, the method comprising:
contacting the insect with the composition of any one of claims 1-7, wherein the composition is not substantially toxic when administered to a mammal; and wherein the insect is:
i) a fly selected from the group consisting *D. melanogaster, D. immigrans, D. simulans, D. subobscura, Zaprionus indianus, D. bifurca, D. sechellia, D. yakuba, D. erecta, D. ananassae, D. suzukii, D. pseudoobscura, D. persimilis, D. willistoni, D. mojavensis, D. virilis* or *D. grimshawi, Musca domestica, Stomoxys calcitrans*, and *Bactrocera dorsalis;*
ii) an ant selected from the group consisting of *Tetramorium* sp, *Formica* sp, *Camponotus, Solenopsis invicta, T. immigrans, Formica glacialis, Camponotus, Chromaiodes*, and *Camponotus subarbatus* sp.; or
iii) a mosquito is one selected from *Ae. aegypti, Cx. pipiens, Cx. tarsalis, Cx. quinquefasciatus, An. freeborni* and *An. quadrimaculatus*.

Embodiment 19 provides the method of any one of embodiments 15-18, wherein the mammal is a human.

Embodiment 20 provides the method of any one of embodiments 15-19, wherein the odorant is at least one selected from the group consisting of $C_6$ to $C_{10}$ alkenes, pyranones, furanones, benzopyranones, benzofuranones, hemiterpenes, monoterpenes, sesquiterpenes, diterpenes, triterpenes and retinoids.

Embodiment 21 provides the method of any one of embodiments 15-20 wherein the sodium salt is selected from the group consisting of sodium chloride and sodium sulphate.

Embodiment 22 provides the method of any one of embodiments 15-21, wherein the attractant is at least one selected from pheromones, pheromone mimics, 2-naphthalene-methanol, naphthalene, steroid derivatives, camphor, turpentine oil, plant volatiles, flower oils, and $CO_2$.

Embodiment 23 provides the method of any one of embodiments 15-22, wherein the dispersing agent is at least one selected from an effervescent material and a swellable substance.

Embodiment 24 provides the method of any one of embodiments 15-23, wherein the dispersing agent is at least one selected from the group consisting of polyvinylpyrrolidone and a mixture of citric acid and sodium bicarbonate.

Embodiment 25 provides the method of any one of embodiments 15-24, wherein the feeding stimulant is at least one selected from the group consisting of ergosterol, fermented milk, p-hydroquinone, hydroxyphenyl-β-D-glycopyranoside, catechol, resorcinol, fluoroglucinol, 4-methoxyphenol, 1,4-dimethoxybenzene, 4-phenoxyphenol, phenylhydroquinone, 4-benzyloxyphenol, quinhydrone.

Embodiment 26 provides the method of any one of embodiments 15-25, wherein the surfactant is at least one anionic surfactant selected from the group consisting of fatty acids, alkyl aryl sulphonates, long chain (fatty) alcohol sulphates, olefin sulphates and sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates.

Embodiment 27 provides the method of any one of embodiments 15-26, wherein the surfactant is at least one cationic surfactant selected from the group consisting of alkylamine salts, quaternary ammonium salts, sulphonium salts and phosphonium salts.

Embodiment 28 provides the method of any one of embodiments 15-27, wherein the surfactant is at least one nonionic surfactant selected from the group consisting of silicones, condensates of ethylene oxide with a long chain (fatty) alcohol or (fatty) acid, condensates of ethylene oxide with an amine or an amide, condensation products of ethylene and propylene oxides, esters of glycerol, sucrose or sorbitol, fatty acid alkylol amides, sucrose esters, fluorosurfactants and fatty amine oxides.

Embodiment 29 provides the method of any one of embodiments 15-28, wherein the surfactant is at least one amphoteric surfactant selected from the group consisting of imidazoline compounds, alkylaminoacid salts, and betaines.

Embodiment 30 provides the method of any one of embodiments 15-29, wherein the oil is at least one selected from the group consisting of palm oil, cedarwood oil, opopanax oil. angelica seed oil, and capsicum fruit extracts.

Embodiment 31 provides the method of any one of embodiments 15-30, wherein the humectant is at least one selected from the group consisting of glucose, ammonium sulfate, urea fructose, glycerol, and glycol derivatives.

What is claimed is:

1. An insecticidal composition consisting of:
   i) a suspension concentrate consisting of:
      about 10-50% (w/w) erythritol relative to the total weight of the composition,
      about 0.1-5% (w/w) sucrose relative to the total weight of the composition,
      about 0.05-1% (w/w) acrylic thickener relative to the total weight of the composition,
      about 10-40% (w/w) glycerol relative to the total weight of the composition, and water; or
   ii) a gel consisting of:
      about 10-50% (w/w) erythritol relative to the total weight of the composition,
      about 0.1-5% (w/w) sucrose relative to the total weight of the composition,
      about 0.1-2% (w/w) acrylic thickener relative to the total weight of the composition,
      about 10-40% (w/w) glycerol relative to the total weight of the composition, and water; and
   wherein erythritol is the only insecticide or insecticidally active agent in the insecticidal composition.

2. The insecticidal composition of claim 1, wherein the acrylic thickener is a carboxyl vinyl polymer.

3. An insect bait, comprising:
the insecticidal composition of claim 1, and
a substrate that comprises the insecticidal composition.

4. The bait of claim 3, wherein the substrate comprises cellulose.

5. The bait of claim 4, wherein the cellulose is paper.

6. The bait of claim 4, wherein the composition is absorbed in the cellulose.

7. The bait of claim 3, wherein the bait is an insect bait station.

8. A method for killing an insect or impairing an insect's ability to function, the method comprising:
   contacting the insect with the insecticidal gel composition of claim 1,
   and
   wherein the insect is a termite selected from the group consisting of *Reticulitermes flavipes, Reticulitermes virginicus, Reticulitermes hageni, Coptotermes formosanus, Amitermes floridensis, Incitermes minor, Neothermes connexus, R. hesperus, R. tibialis, Heterotermes aureus, Reticulitermes* sp., *Heterotermes* sp., and *Termitidae* sp.

9. A method for killing an insect or impairing an insect's ability to function, the method comprising:
   contacting the insect with the insecticidal composition of claim 1, and
   wherein the insect is a leaf cutter ant selected from the genera *Atta* and *Acromyrmex*.

10. The method of claim 1, wherein the leaf cutter ant is a species selected from the group consisting of *Acromyrmex ambiguus, Acromyrmex ameliae, Acromyrmex aspersus, Acromyrmex balzani, Acromyrmex biscutatus, Acromyrmex coronatus, Acromyrmex crassispinus, Acromyrmex diasi, Acromyrmex disciger, Acromyrmex echinatior, Acromyrmex evenkul, Acromyrmex fowleri, Acromyrmexfracticornis, Acromyrmex heyeri, Acromyrmex hispidus, Acromyrmex hystrix, Acromyrmex insinuator, Acromyrmex landolti, Acromyrmex laticeps, Acromyrmex lobicornis, Acromyrmex lundii, Acromyrmex niger, Acromyrmex nigrosetosus, Acromyrmex nobilis, Acromyrmex octospinosus, Acromyrmex pubescens, Acromyrmex pulvereus, Acromyrmex rugosus, Acromyrmex silvestrii, Acromyrmex striatus, Acromyrmex subterraneus, Acromyrmex versicolor, Acromyrmex volcanus, Atta bisphaerica, Atta capiguara, Atta cephalotes, Atta colombica, Atta cubana, Atta goiana, Atta insularis, Atta laevigata, Atta mexicana, Atta opaciceps, Atta pilosa, Atta robusta, Atta saltensis, Atta sexdens, Atta tardigrada, Atta texana*, and *Atta vollenweideri*.

11. A method for killing an insect or impairing an insect's ability to function, the method comprising:
   contacting the insect with the insecticidal gel composition of claim 1,
   wherein the insect is:
   i) a fly selected from the group consisting *D. melanogaster, D. immigrans, D. simulans, D. subobscura, Zaprionus indianus, D. bifurca, D. sechellia, D. yakuba, D. erecta, D. ananassae, D. suzukii, D. pseudoobscura, D. persimilis, D. willistoni, D. mojavensis, D. virilis* or *D. grimshawi, Musca domestica, Stomoxys calcitrans*, and *Bactrocera dorsalis;*
   ii) an ant selected from the group consisting of *Tetramorium* sp, *Formica* sp, *Camponotus, Solenopsis invicta, T. immigrans, Formica glacialis, Camponotus, Chromaiodes*, and *Camponotus subarbatus* sp.; or
   iii) a mosquito selected from the group consisting of *Ae. aegypti, Cx. pipiens, Cx. tarsalis, Cx. quinquefasciatus, An. freeborni* and *An. quadrimaculatus*.

12. An insecticidal composition consisting of:
   i) a suspension concentrate consisting of:
      about 25% (w/w) erythritol relative to the total weight of the composition,
      about 2% (w/w) sucrose relative to the total weight of the composition,
      about 0.2% (w/w) carboxyl vinyl polymer relative to the total weight of the composition,
      about 20% (w/w) glycerol relative to the total weight of the composition, and water; or ii) a gel consisting of:
- about 25% (w/w) erythritol relative to the total weight of the composition,
- about 2% (w/w) sucrose relative to the total weight of the composition,
- about 0.4% (w/w) carboxyl vinyl polymer relative to the total weight of the composition,
- about 20% (w/w) glycerol relative to the total weight of the composition, and water;

wherein erythritol is the only insecticide or insecticidally active agent in the insecticidal composition.

13. An insecticidal composition consisting of:
i) a suspension concentrate consisting of:
- about 20-30% (w/w) erythritol relative to the total weight of the composition,
- about 1-3% (w/w) sucrose relative to the total weight of the composition,
- about 0.1-0.3% (w/w) carboxyl vinyl polymer relative to the total weight of the composition,
- about 15-25% (w/w) glycerol relative to the total weight of the composition, and water; or ii) a gel consisting of:
- about 20-30% (w/w) erythritol relative to the total weight of the composition,
- about 1-3% (w/w) sucrose relative to the total weight of the composition,
- about 0.2-0.6% (w/w) carboxyl vinyl polymer relative to the total weight of the composition,
- about 15-25% (w/w) glycerol relative to the total weight of the composition, and water;

wherein erythritol is the only insecticide or insecticidally active agent in the insecticidal composition.

\* \* \* \* \*